United States Patent
Cheng et al.

(10) Patent No.: US 11,038,910 B1
(45) Date of Patent: Jun. 15, 2021

(54) CYBERSECURITY FOR A SMART HOME

(71) Applicant: Trend Micro Incorporated, Tokyo (JP)

(72) Inventors: Yi-Li Cheng, Taipei (TW); Yao-Tang Chang, Taipei (TW); Peng-Shih Pu, Taipei (TW); Che-Fu Yeh, Taipei (TW); Shih-Han Hsu, Taipei (TW); Tsung-Fu Lin, Taipei (TW); Ming-Hung Chen, Taipei (TW); Yu-Min Chang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 302 days.

(21) Appl. No.: 16/257,633

(22) Filed: Jan. 25, 2019

(51) Int. Cl.
*H04L 29/06* (2006.01)
*G06N 20/20* (2019.01)

(52) U.S. Cl.
CPC ......... *H04L 63/1425* (2013.01); *G06N 20/20* (2019.01); *H04L 63/1416* (2013.01); *H04L 63/1433* (2013.01)

(58) Field of Classification Search
CPC . H04L 63/14; H04L 63/1441; H04L 63/1408; H04L 63/1425; H04L 63/1416; H04L 63/1433; G06N 20/20; H04W 12/12
See application file for complete search history.

(56) References Cited

U.S. PATENT DOCUMENTS

| | | | |
|---|---|---|---|
| 9,516,053 B1* | 12/2016 | Muddu | H04L 63/1416 |
| 10,264,066 B2 | 4/2019 | Fishler et al. | |
| 10,270,863 B1 | 4/2019 | Swengler | |
| 10,270,881 B2 | 4/2019 | George et al. | |
| 10,271,191 B2 | 4/2019 | Adrangi et al. | |
| 10,272,014 B2 | 4/2019 | Potucek et al. | |
| 10,274,917 B2 | 4/2019 | Christopher et al. | |
| 10,275,962 B2 | 4/2019 | Britt | |
| 10,275,967 B2 | 4/2019 | Chong | |
| 10,276,010 B2 | 4/2019 | Lee | |
| 10,276,921 B2 | 4/2019 | Vermes et al. | |
| 10,277,682 B2 | 4/2019 | Biswas et al. | |
| 10,277,712 B2 | 4/2019 | Kim et al. | |
| 10,278,244 B1 | 4/2019 | Bahrehmand | |
| 10,282,484 B2 | 5/2019 | Piccand et al. | |
| 10,284,684 B2 | 5/2019 | Tellado et al. | |
| 10,285,152 B2 | 5/2019 | Park et al. | |
| 10,623,289 B1* | 4/2020 | McCorkendale | H04L 43/0817 |
| 10,673,880 B1* | 6/2020 | Pratt | G06N 20/00 |
| 2008/0222717 A1* | 9/2008 | Rothstein | H04L 63/1416 726/14 |
| 2016/0261465 A1* | 9/2016 | Gupta | H04L 41/14 |
| 2016/0352766 A1* | 12/2016 | Flacher | H04L 67/10 |

(Continued)

*Primary Examiner* — Malcolm Cribbs
(74) *Attorney, Agent, or Firm* — Okamoto & Benedicto LLP

(57) ABSTRACT

A smart home includes Internet of things (IOT) devices that are paired with an IOT gateway. A backend system is in communication with the IOT gateway to receive IOT operating data of the IOT devices. The backend system generates a machine learning model for an IOT device. The machine learning model is consulted with IOT operating data of the IOT device to detect anomalous operating behavior of the IOT device. The machine learning model is updated as more and newer IOT operating data of the IOT device are received by the backend system.

6 Claims, 26 Drawing Sheets

(56) References Cited

U.S. PATENT DOCUMENTS

| | | | |
|---|---|---|---|
| 2016/0381030 A1* | 12/2016 | Chillappa | H04W 4/38 |
| | | | 726/11 |
| 2017/0034193 A1* | 2/2017 | Schulman | H04L 63/1441 |
| 2017/0099309 A1* | 4/2017 | Di Pietro | H04L 63/1416 |
| 2017/0104773 A1* | 4/2017 | Flacher | H04L 63/1458 |
| 2017/0208079 A1* | 7/2017 | Cammarota | H04L 63/1425 |
| 2017/0251012 A1* | 8/2017 | Stockdale | H04L 63/1425 |
| 2017/0310691 A1* | 10/2017 | Vasseur | H04L 63/1458 |
| 2018/0241781 A1* | 8/2018 | Vasters | H04L 63/14 |
| 2018/0359272 A1* | 12/2018 | Mizrachi | G06F 21/57 |
| 2018/0375889 A1* | 12/2018 | Dickenson | H04L 63/14 |
| 2019/0007447 A1* | 1/2019 | Barnes | H04L 41/12 |
| 2019/0014137 A1* | 1/2019 | Du | H04L 63/20 |
| 2019/0166144 A1* | 5/2019 | Mirsky | H04W 12/1204 |
| 2019/0236493 A1* | 8/2019 | Cam-Winget | H04L 63/1425 |
| 2020/0211721 A1* | 7/2020 | Ochoa | G06N 5/003 |
| 2020/0236112 A1* | 7/2020 | Pularikkal | H04L 63/104 |

* cited by examiner

US 11,038,910 B1

CYBERSECURITY FOR A SMART HOME

BACKGROUND OF THE INVENTION

1. Field of the Invention

The present invention relates generally to computer security, and more particularly but not exclusively to smart home cybersecurity.

2. Description of the Background Art

Internet of things (IOT) are everyday devices with an embedded computer that enables the IOT devices to communicate to other devices over a computer network. A smart home is a family residence with IOT devices. Examples of IOT devices employed in a smart home include a smart light bulb, smart power outlet, smart thermostat, etc. When deployed in a smart home, IOT devices allow for home automation, such as controlling ambient temperature, dimming a light bulb, turning off a regular appliance (i.e., a "dumb" home appliance) by controlling a smart plug, etc., remotely over a computer network or automatically according to a program.

IOT devices can be controlled from outside the home, such as by accessing them over the Internet. Unlike a general purpose computing device, such as a laptop or desktop computer, an IOT device does not have enough computing resources to run computer security software, such as an antivirus software. More particularly, an IOT device typically only has enough computing resources to perform limited tasks.

SUMMARY

In one embodiment, a smart home includes Internet of things (IOT) devices that are paired with an IOT gateway. A backend system is in communication with the IOT gateway to receive IOT operating data of the IOT devices. The backend system generates a machine learning model for an IOT device. The machine learning model is consulted with IOT operating data of the IOT device to detect anomalous operating behavior of the IOT device. The machine learning model is updated as more and newer IOT operating data of the IOT device are received by the backend system.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Generally speaking, a smart home is a residence of a family. A smart home is "smart" in that it is a family residence that has IOT devices. Unlike a commercial or government facility, a family residence has no or very limited infrastructure and personnel to protect against cyberattacks. Worse, IOT devices have limited computing resources to have integrated security measures. Yet, various IOT devices are continually released by manufacturers specifically for deployment in family residences. Embodiments of the present invention address these issues relating to vulnerability of smart homes to cyberattacks.

Figure 1:
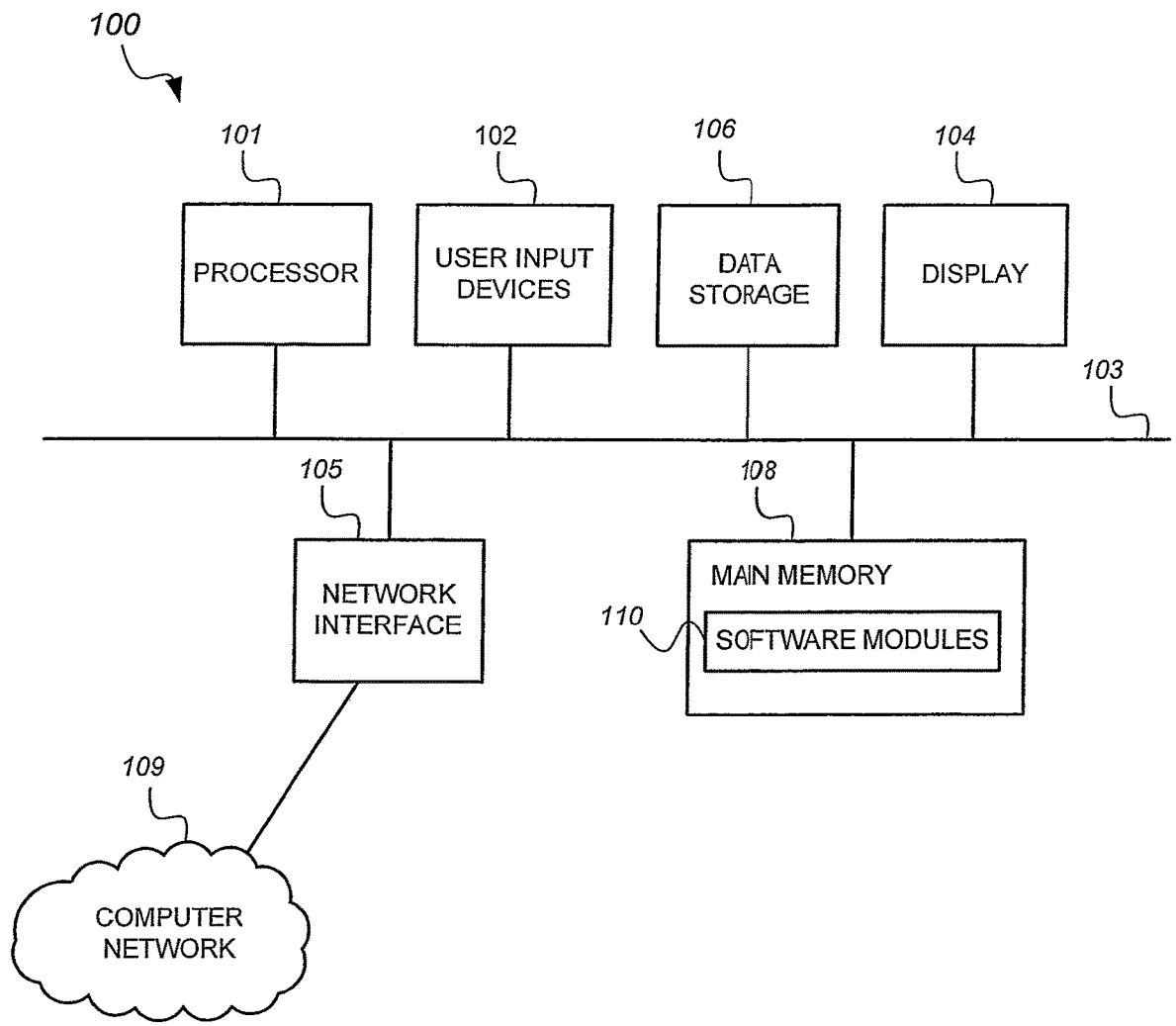
FIG. 1 shows a logical diagram of a computer system that may be employed with embodiments of the present invention.

Referring now to FIG. 1, there is shown a logical diagram of a computer system 100 that may be employed with embodiments of the present invention. The computer system 100 may be employed as an IOT gateway, a backend system, or other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment, the software modules 110 include a machine learning (ML) model, which is also referred to as an artificial intelligence model, of an IOT device. The ML model, which may be stored in the memory 108 of an IOT gateway or backend system, may be executed by the processor 101 to receive operating data from the IOT device and make a determination as to whether or not the operating data indicate a normal or anomalous operating behavior of the IOT device.

Figure 2:
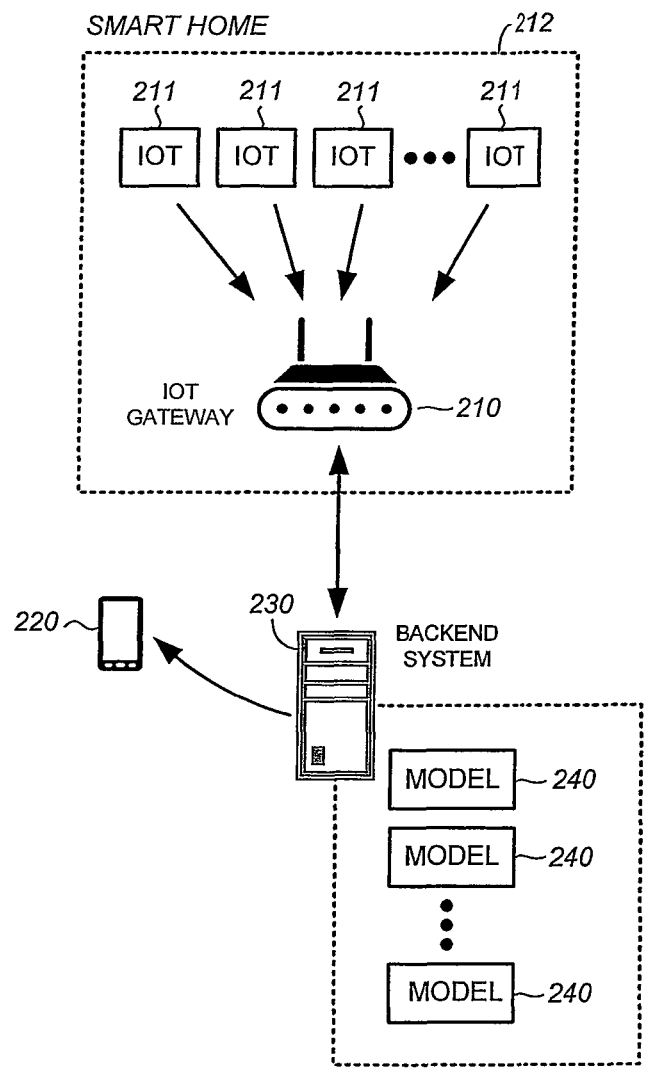
FIGS. 2-4 show logical diagrams of Internet of things (IOT) systems in accordance with embodiments of the present invention.

FIG. 2 shows a logical diagram of an IOT system in accordance with an embodiment of the present invention. In the example of FIG. 2, the IOT system comprises a plurality of IOT devices 211, an IOT gateway 210, and a backend system 230. The IOT devices 211 and the IOT gateway 210 are deployed in a smart home 212.

An IOT device 211 comprises an everyday home device with an embedded computer that allows the IOT device 211 to communicate with other devices over a computer network and to perform tasks as programmed and/or commanded over the computer network. An IOT device 211 may be a commercially-available smart light bulb, thermostat, garage door opener, lock, power plug, or other IOT device.

An IOT gateway 210 may comprise a smart home hub or gateway for IOT devices 211. An IOT gateway 210 is configured to be paired with an IOT device 211 to receive operating data from the IOT device 211. The operating data of an IOT device 211 comprise data indicating the operating behavior and/or status of the IOT device 211, and will vary depending on the type, model, and manufacturer of the IOT device 211. For example, an IOT device 211 comprising a smart light bulb may have operating data indicating light intensity, health status, and so on. Operating data of an IOT device 211 are also referred to as "IOT operating data."

Generally speaking, components of an IOT system that are deployed inside a smart home are also referred to as "local" components, whereas components that are deployed outside the smart home and are accessible over the Internet are also referred to as "cloud components." As an example, the IOT devices 211 and IOT gateway 210 are on the local side of the IOT system, and the backend system 230 is on the cloud side of the IOT system.

The backend system 230 comprises a computer with associated software for receiving IOT operating data of the IOT devices 211 from the IOT gateway 210, and using the IOT operating data to train a machine learning (ML) model 240 to identify normal operating behavior; an operating behavior that is not normal may be deemed to be anomalous. An ML model 240 of an IOT device 211 may be designated as part of the IOT device's 211 device profile. An ML model 240 of an IOT device 211 may be trained using the IOT operating data of that particular IOT device 211. An IOT device 211 may also be assigned an ML model 240 that has been trained using IOT operating data of other, but similar, IOT devices 211. In the example of FIG. 2, each IOT device 211 has a corresponding ML model 240 on the backend system 230.

In the example of FIG. 2, the ML models 240 are not deployed on the local side of the IOT system; the ML models 240 remain in the cloud. Accordingly, the detection of anomalous operating behavior of an IOT device 211 is performed by receiving the IOT operating data of the IOT device 211 in the backend system 230, and inputting the IOT operating data to the corresponding ML model 240 to determine if the IOT device 211 is exhibiting normal operating behavior. Operating behavior that is not normal is deemed to be anomalous operating behavior. The backend system 230 may be configured to perform a security action to address a detected anomalous operating behavior, such as sending an alert to a device 220 of a resident of the smart home 212 or smart home monitoring service that something is wrong with the IOT device 211. The alert may be sent by way of an email, text message, audible alarm, visual alarm, and so on.

Figure 3:
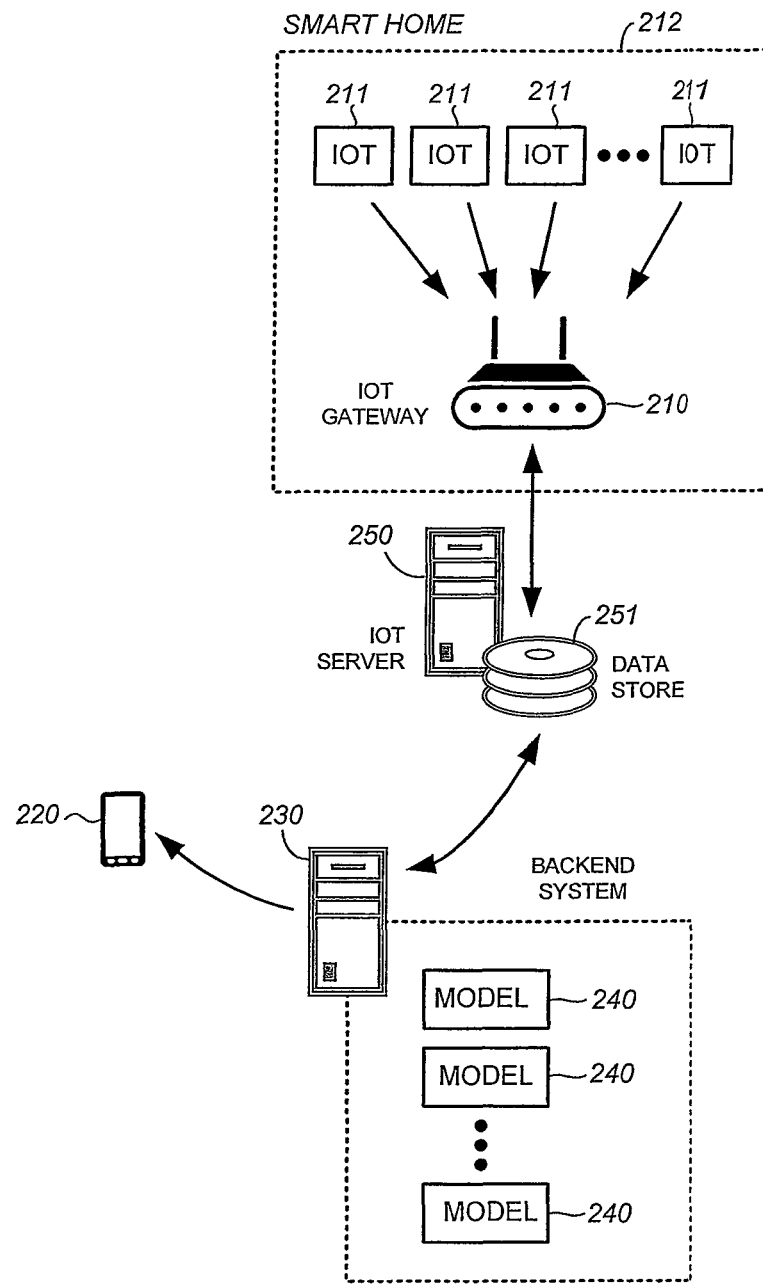

FIG. 3 shows a logical diagram of an IOT system in accordance with another embodiment of the present invention. The IOT system of FIG. 3 is the same as that of FIG. 2 except for the addition of an IOT server 250. The IOT server 250 may comprise a computer with associated software for receiving IOT operating data of the IOT devices 211 from the IOT gateway 210 and storing the received IOT operating data on a data store 251 (e.g., database stored on a data storage device).

In the example of FIG. 3, the backend system 230 is configured to receive the IOT operating data from the IOT server 250, instead of from the IOT gateway 210. The backend system 230 otherwise operates in the same manner as in the IOT system of FIG. 2, using ML models 240 to detect anomalous operating behavior of corresponding IOT devices 211 and performing a security action to address a detected anomalous operating behavior of an IOT device 211, such as by sending an alert to a device 220 of a resident of the smart home 212 or a smart home monitoring service. The alert may be sent by way of an email, text message, audible alarm, visual alarm, and so on. The IOT system of FIG. 3 may be implemented in cases where the IOT gateway 210 and IOT server 250 are from the same manufacturer, but the backend system 230 is a third-party system (i.e., not affiliated with the manufacturer) that cannot communicate directly with the IOT gateway 210.

Figure 4:
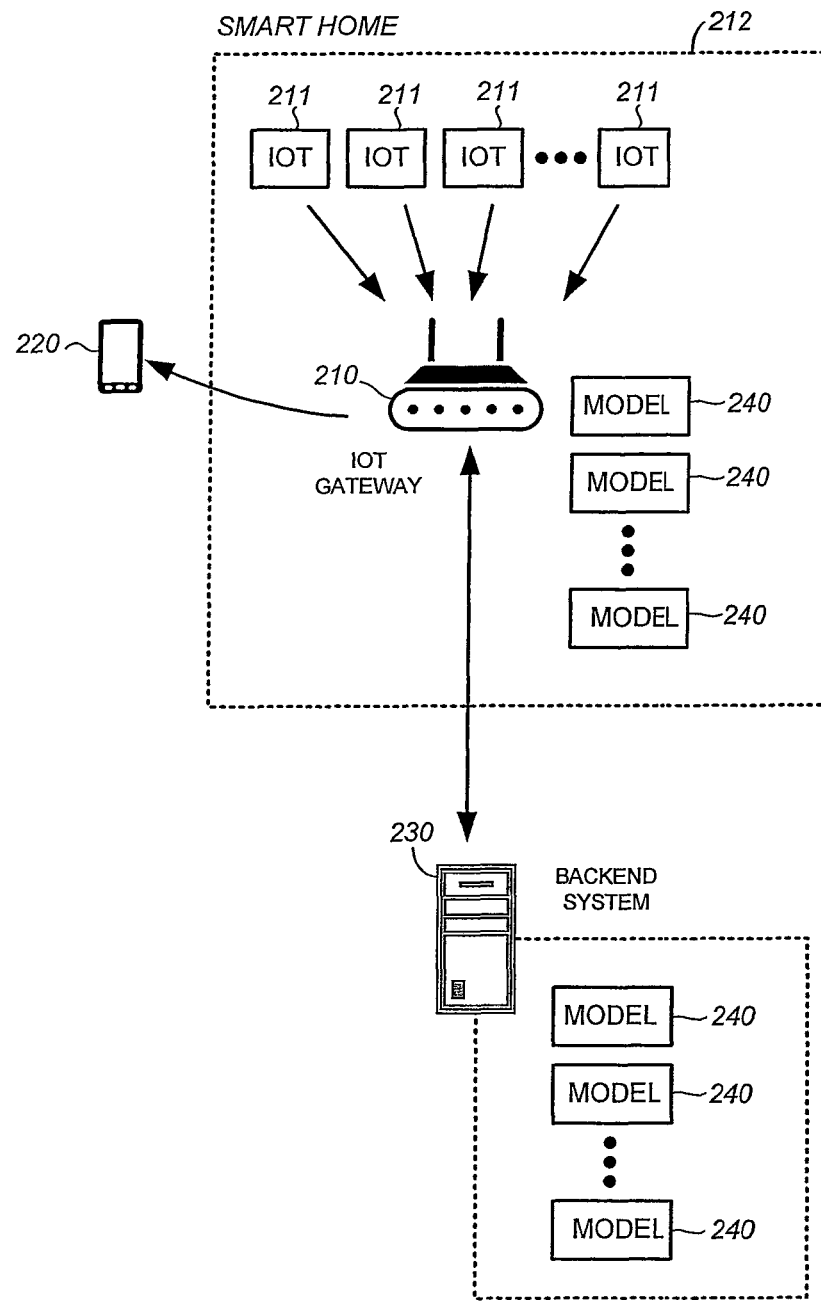

FIG. 4 shows a logical diagram of an IOT system in accordance with another embodiment of the present invention. The IOT system of FIG. 4 is the same as that of FIG. 2 except that the IOT gateway 210 has sufficient computing resources to store and execute the ML models 240. In the example of FIG. 4, the IOT gateway 210 forwards received IOT operating data to the backend system 230, which uses the IOT operating data to train the ML models 240. The backend system 230 provides the ML models 240 to the IOT gateway 210, which uses the ML models 240 to detect anomalous operating behavior of the IOT devices 211. The IOT gateway 210 may perform a security action to address a detected anomalous operating behavior of an IOT device 211, such as by sending an alert to a device 220 of a resident of the smart home 212 or a smart home monitoring service.

The following examples use the IOT system of FIG. 4 for illustration purposes only. More particularly, in the following examples, ML models are stored and executed in an IOT gateway to detect anomalous operating behavior of an IOT device. As can be appreciated, the following examples also apply, with suitable modifications, to the IOT system of FIG. 2, FIG. 3, or other IOT system.

Figure 5A:
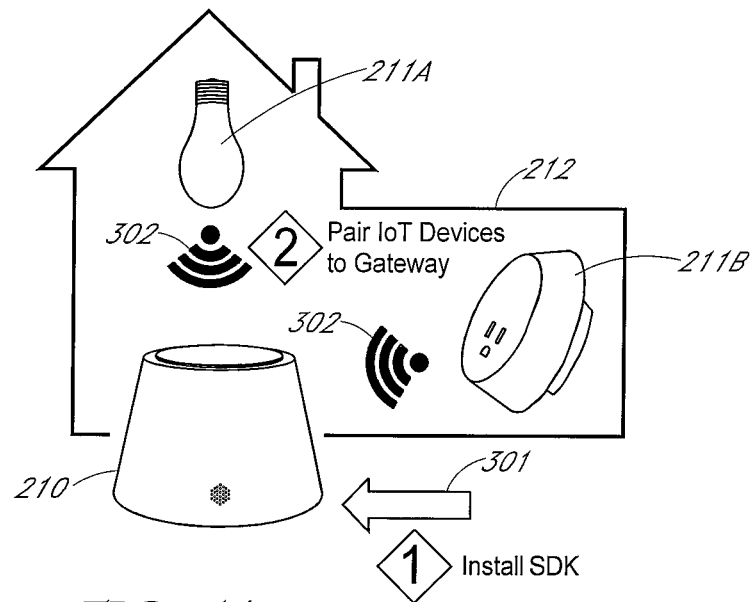
FIGS. 5A and 5B show a flow diagram of a method of securing IOT devices of a smart home in accordance with an embodiment of the present invention.
Figure 5B:
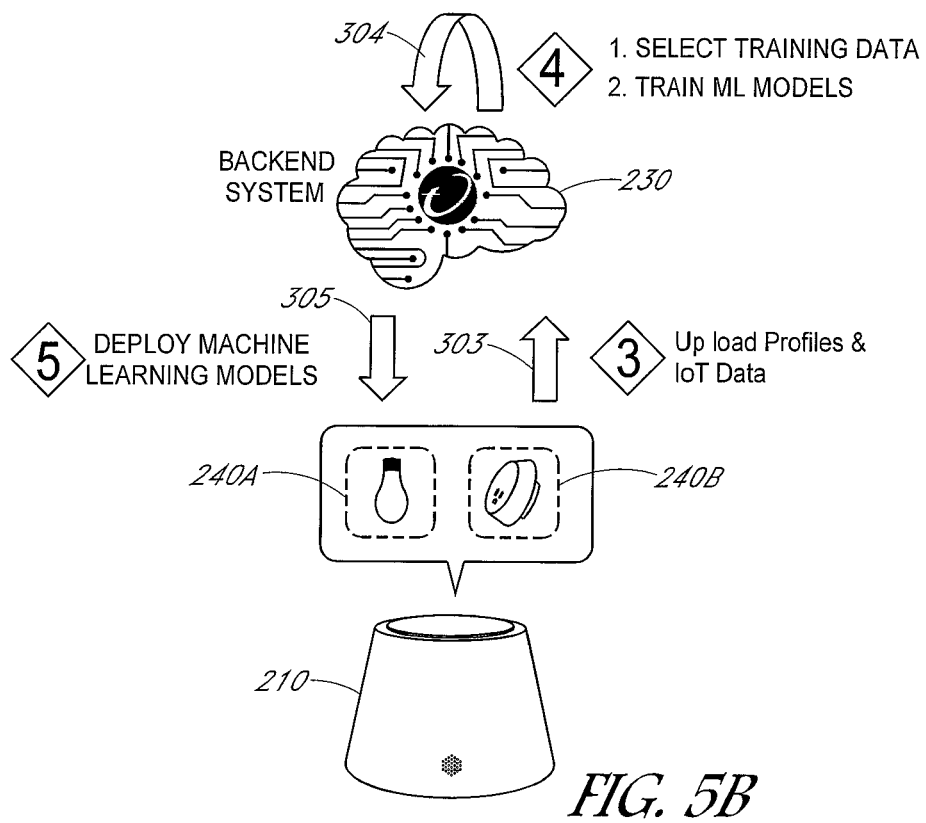

FIGS. 5A and 5B show a flow diagram of a method of securing IOT devices of a smart home in accordance with an embodiment of the present invention. In the example of FIGS. 5A and 5B, a smart home 212 includes an IOT device 211A, IOT device 211B, and an IOT gateway 210. In one embodiment, an IOT device 211A is a smart bulb and an IOT device 211B is a smart plug. As can be appreciated, embodiments of the present invention are also applicable to other IOT devices.

In the example of FIG. 5A, a software development kit (SDK) is optionally installed in the IOT gateway 210 (see arrow 301). The SDK allows the backend system 230 to communicate and work with the IOT gateway 210. As can be appreciated, the IOT gateway 210 may also be directly compatible with the backend system 230; an SDK does not have to be installed in the IOT gateway 210 in that case.

The IOT devices 211A and 211B are paired with the IOT gateway 210 (see beams 302). The pairing, which may be initiated during startup of the IOT devices 211A and 211B, allows the IOT gateway 210 to recognize and initiate communication with the IOT devices 211A and 211B. The IOT gateway 210 may identify the IOT devices 211A and 211B (e.g., type, model, manufacturer) and their profiles during the pairing process. The IOT gateway 210 thereafter starts receiving IOT operating data from the IOT devices 211A and 211B.

Continuing in the example of FIG. 5B, the IOT gateway 210 may provide, to the backend system 230, the profiles and IOT operating data of the IOT devices 211A and 211B (see arrow 303). The backend system 230 selects IOT operating data that may be used to train the ML models 240A and 240B of the IOT devices 211A and 211B, respectively (see arrow 304). The backend system 230 provides the trained ML models 240A and 240B to the IOT gateway 210 (see arrow 305). The IOT gateway 210 receives and stores the ML models 240A and 240B. In the example of FIG. 5B, the ML model 240A is for the IOT device 211A, and the ML model 240B is for the IOT device 211B. The IOT gateway 210 receives additional IOT operating data from the IOT device 211A and consults the ML model 240A with the additional IOT operating data to determine whether or not the IOT device 211A is exhibiting anomalous operating behavior. The IOT gateway 210 does the same for the IOT device 211B, and other IOT devices with corresponding ML models installed in the IOT gateway 210.

Figure 6:
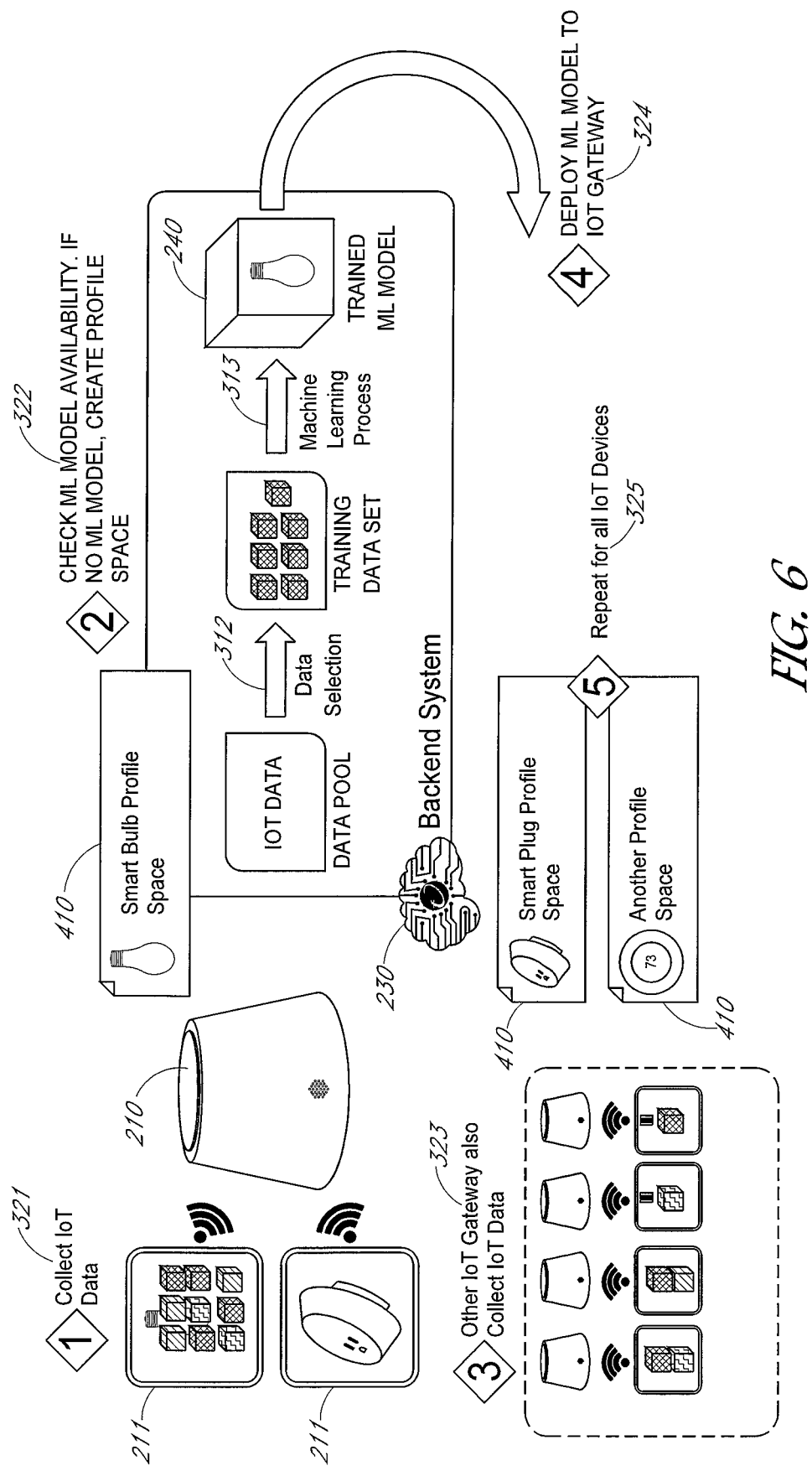
FIG. 6 shows a flow diagram of a method of training and deploying machine learning (ML) models of IOT devices in accordance with an embodiment of the present invention.

FIG. 6 shows a flow diagram of a method of training and deploying ML models of IOT devices in accordance with an embodiment of the present invention. The method of FIG. 6 illustrates further details of the method of FIGS. 5A and 5B regarding collection of IOT operating data and training of ML models.

In the example of FIG. 6, the IOT gateway 210 of the smart home 212 (shown in FIG. 5A) collects IOT operating data of the IOT devices 211 (see action 321). The IOT gateway 210 provides the received IOT operating data to the backend system 230.

In one embodiment, IOT operating data received from the IOT gateway 210 include an identifier of the IOT device 211 from which the IOT operating data was collected. Upon receiving the IOT operating data, the backend system 230 determines whether or not the IOT device 211 that provided the IOT operating data has a corresponding profile space 410 in the backend system 230. In one embodiment, a profile space 410 comprises memory space for storing collected IOT operating data (also referred to as a "data pool") and one or more ML models 240. In the example of FIG. 6, a first profile space 410 is for a smart bulb. Accordingly, the profile space 410 of the smart bulb includes the data pool of the smart bulb and the ML model 240 of the smart bulb. FIG. 6 also shows a second profile space 410 for a smart plug, and another profile space 410 for another IOT device 211.

When an IOT device 211 does not have a corresponding ML model 240, the backend system 230 creates a profile space 410 for the IOT device 211, stores the IOT operating data of the IOT device 211 in the profile space 410, and proceeds to generate an ML model 240 for the IOT device 211 (see action 322). The backend system 230 selects training data from the data pool of the IOT device 211 (see arrow 312) by, for example, using cosine distance to identify most similar cluster center point. Any suitable clustering algorithm employed in machine learning applications, such as K-mean, DBSCAN, HDBSCAN, etc. algorithms, may be employed to select the training data from the data pool. The selected training data are used to train the ML model 240 for the IOT device 211 (see arrow 313). A 1-class machine learning algorithm, such as support vector machine (SVM) or isolation forest, may be used to train the ML model 240.

In the example of FIG. 6, the backend system 230 also receives and collects IOT operating data gathered by other IOT gateways from other IOT devices (see action 323). The other IOT gateways and other IOT devices may be in the same or different smart home as the IOT gateway 210. Receiving and collecting IOT operating data from many IOT gateways allow the backend system 230 to have a larger data pool of IOT operating data for various IOT devices, thereby improving the prediction accuracy of the ML models. For example, the backend system 230 may correlate the data pool of an IOT device with those of similar or the same IOT devices to identify and remove inconsistent/unreliable IOT operating data from the data pool.

After the ML model 240 is created by the backend system 230, the ML model 240 is deployed to the IOT gateway 210 of the corresponding IOT device 211 (see action 324). The same process is repeated for all IOT devices 211 supported by the backend system 230 (see action 325).

Figure 7:
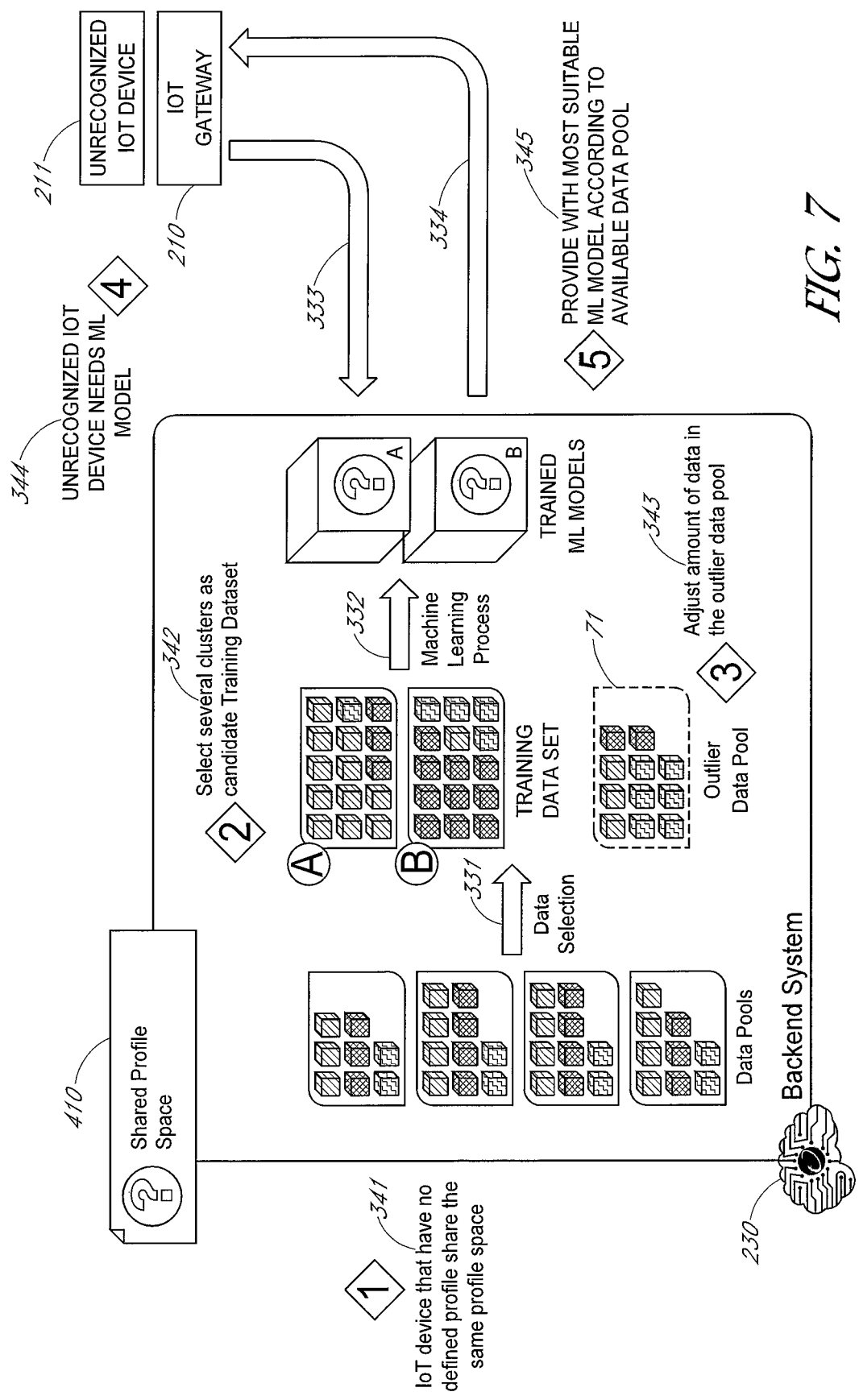
FIG. 7 shows a flow diagram of a method of training ML models of unrecognized IOT devices in accordance with an embodiment of the present invention.

FIG. 7 shows a flow diagram of a method of training ML models of unrecognized IOT devices in accordance with an embodiment of the present invention. An IOT device 211 may have a predefined device profile that identifies the IOT operating data that may be expected from the IOT device 211 and other operational characteristics of the IOT device 211. Information regarding the device profile of an IOT device 211 may be obtained from its manufacturer. The backend system 230 may maintain a database of device profiles of recognized IOT devices 211. As previously explained, the backend system 230 may also maintain a profile space 410 for each recognized IOT device 211, with the profile space 410 including a data pool and ML model 240 of the IOT device 211.

In some cases, a smart home 212 will include an IOT device 211 that, although works with a corresponding IOT gateway 210, is not recognized by the backend system 230 because the IOT device 211 has no device profile available to the backend system 230. For example, the unrecognized IOT device 211 may be a new model and the backend system 230 has yet to be updated with the device profile of the unrecognized IOT device 211.

In one embodiment, unrecognized IOT devices 211, i.e., IOT devices 211 with no device profile defined in the backend system 230, share the same profile space 410 (see action 341). In the example of FIG. 7, the data pools in the shared profile space 410 comprise IOT operating data of unrecognized IOT devices 211. In one embodiment, the backend system 230 treats all of the data pools in the shared profile space 410 as a single data pool from which training data are selected. The backend system 230 performs a clustering algorithm on all of the IOT operating data pools in the shared profile space 410 to generate one or more clusters of training data sets (see action 342). In the example of FIG. 7, a first training data set "A" comprises a first cluster of similar IOT operating data selected from all the data pools in the shared profile space 410, a second training data set "B" comprises a second cluster of similar IOT operating data selected from all the data pools in the shared profile space 410, and so on (see arrow 331). The backend system 230 trains an ML model 240 using IOT operating data of a training data set. In the example of FIG. 7, a first ML model "A" is trained using the first training data set "A", a second ML model "B" is trained using the second training data set "B", and so on (see arrow 332).

In the example of FIG. 7, outlier IOT operating data (i.e., IOT operating data that cannot be clustered with other IOT operating data) are grouped together in an outlier IOT operating data pool (labeled as 71). The amount of IOT operating data in the outlier data pool may be increased or decreased, e.g., by adjusting the clustering algorithm, to control the quality of the IOT operating data in the training data sets (see action 343).

In the example of FIG. 7, the backend system 230 receives IOT operating data of an unrecognized IOT device 211 (see arrow 333). The data pool of the unrecognized IOT device 211 is stored along with the data pool of other unrecognized IOT devices 211 in the shared profile space 410. The unrecognized 10T device 211 needs an ML model (see action 344) to be protected from cyberattacks. In response, the backend system 230 provides the most suitable, trained ML model 240 to the unrecognized IOT device 211 (see action 345), given the available data pool in the shared profile space 410. For example, the backend system 230 may find a training data set that has IOT operating data most similar to the IOT operating data of the unrecognized IOT device 211, and provide the corresponding ML model 240 to the unrecognized IOT device 211. For example, the backend system 230 may find that the IOT operating data of the second training data set "B" are most similar to the IOT operating data of the unrecognized IOT device 211. In that case, the backend system 230 may provide the ML model "B" to the gateway 210 of the unrecognized IOT device 211 (see arrow 334).

Figure 8:
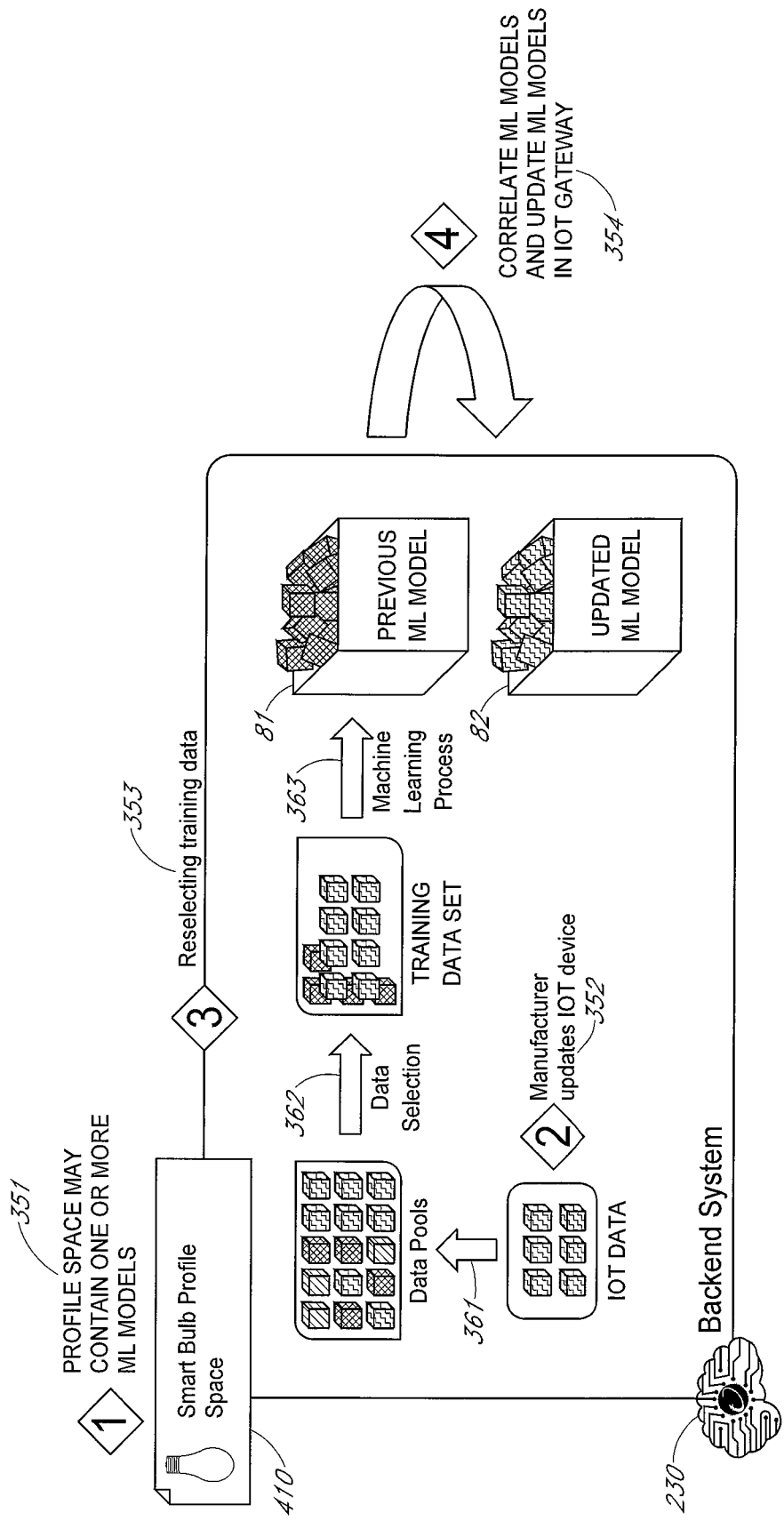
FIG. 8 shows a flow diagram of a method of retraining an ML model in accordance with an embodiment of the present invention.

FIG. 8 shows a flow diagram of a method of retraining an ML model in accordance with an embodiment of the present invention. In the example of FIG. 8, an IOT device comprising a smart bulb is allotted a profile space 410 containing a "previous" ML model (labeled as 81), which is to be updated to reflect changes made by the manufacturer to the operating characteristics of the smart bulb.

Generally speaking, a profile space 410 may have one or more ML models for an IOT device (see action 351). The operating behavior of an IOT device may change when the IOT device is updated by its manufacturer (see action 352). In the example of FIG. 8, the smart bulb is updated by its manufacturer, thereby changing its operating behavior. The change in operating behavior is reflected in the collected IOT operating data of the smart bulb (see arrow 361), which are included in the data pool in the profile space 410 of the smart bulb. As can be appreciated, the new operating behavior of the smart bulb will affect the accuracy of previously trained ML models of the smart bulb. In the example of FIG. 8, the previous ML model of the smart bulb (labeled as 81) is the version currently deployed in the IOT gateway paired with the smart bulb.

In one embodiment, an ML model of an IOT device is updated by retraining the ML model using a training data set comprising reselected IOT operating data from the data pool (see action 353). In the example of FIG. 8, the data pool now comprises newly received IOT operating data that reflect the new operating behavior of the smart bulb. Accordingly, reselecting data from the data pool to generate a new training data set (see 362) allows for training an updated ML model (labeled as 82) with the new IOT operating data (see arrow 363). The updated ML model may be correlated with the previous ML model to improve accuracy of the updated ML model, which is then deployed in the IOT gateway that is paired with the smart bulb.

FIGS. 9-15 show logical diagrams that illustrate a method of training an ML model of a recognized IOT device in accordance with an embodiment of the present invention.

Figure 9:
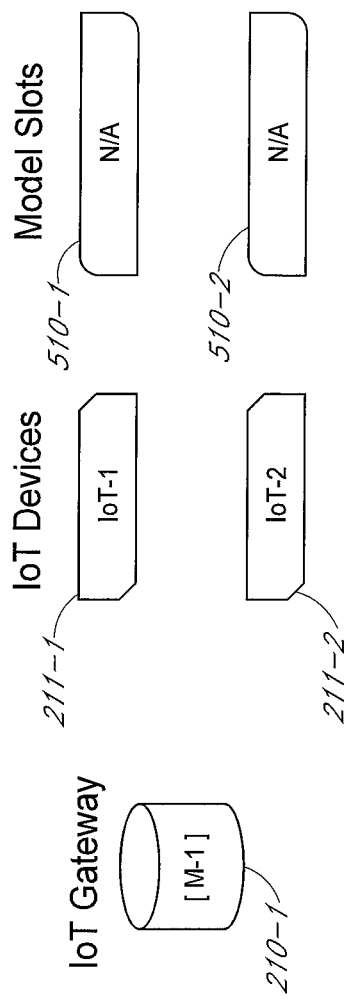
FIGS. 9-15 show logical diagrams that illustrate a method of training an ML model of a recognized IOT device in accordance with an embodiment of the present invention
Figure 10:
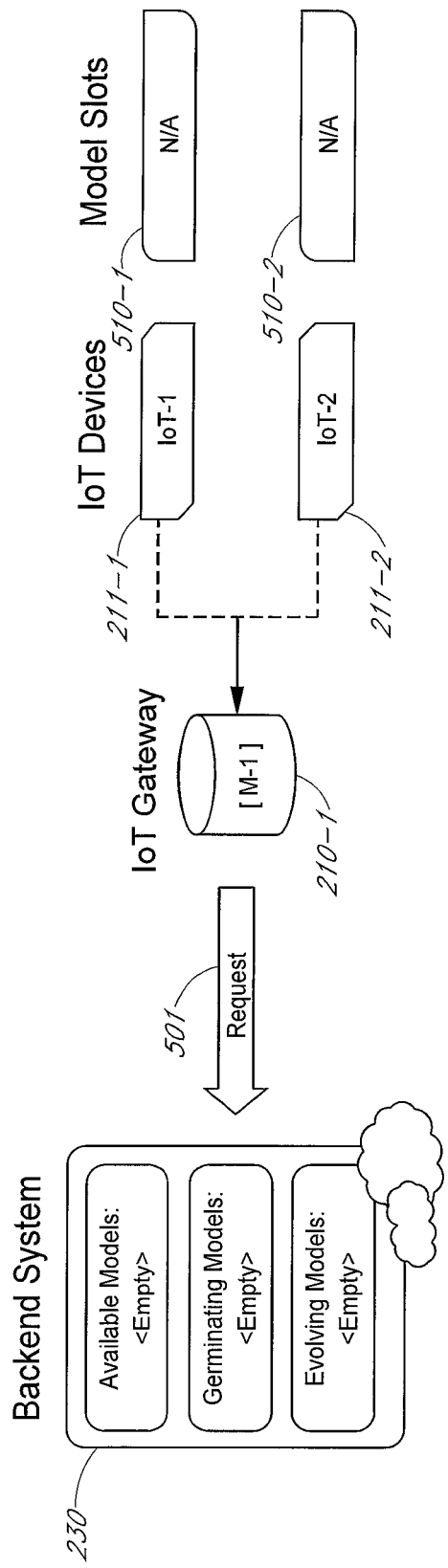

Beginning with FIG. 9, an IOT gateway 210-1 (also labeled as "[M-1]") is paired with IOT devices 211-1 (also labeled as "IoT-1") and 211-2 (also labeled as "IoT-2"). In the example of FIG. 9, the IOT device 211-1 is a recognized IOT device, i.e., has a device profile available to the backend system 230. On the other hand, the IOT device 211-2 is an unrecognized IOT device. In one embodiment, the IOT gateway 210-1 has available model slots for each IOT device. A model slot comprises memory space and processing resources for storing and executing an ML model of a corresponding IOT device. In the example of FIG. 9, the IOT gateway 210-1 has a model slot 510-1 for the IOT device 211-1 and a model slot 510-2 for the IOT device 211-2. The model slots 510-1 and 510-2 currently, in the example of FIG. 9, have no ML model. Accordingly, as shown in FIG. 10, the IOT gateway 210-1 sends a request to the backend system 230 (see arrow 501) for ML models of the IOT devices 211-1 and 211-2. The request may include relevant IOT device profiles that the IOT gateway 210-1 may have, a device profile of the IOT gateway 210-1, and relevant data provided by the IOT devices 211-1 and 211-2.

A backend system 230 may store available ML models, germinating ML models, and evolving ML models. As its name implies, an available ML model is ready for deployment to an IOT gateway. A germinating ML model is a model in the process of being trained, while an evolving ML model is model that is being retrained or transformed. As previously explained, an ML model, whether available, germinating, or evolving, may be stored in the profile space of the corresponding IOT device.

Figure 11:
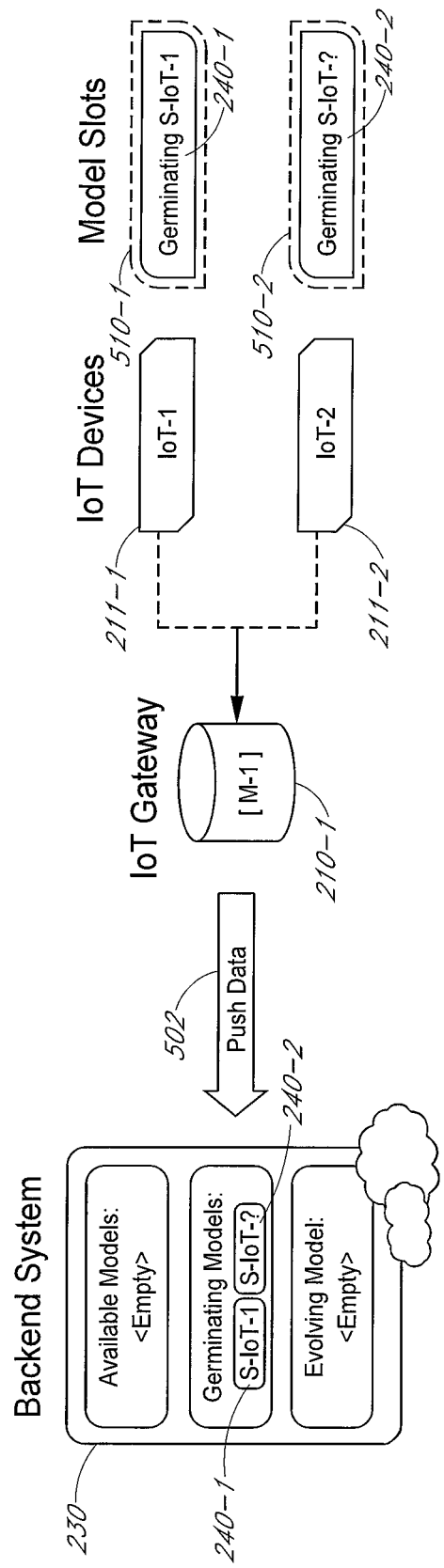

In the example of FIG. 10, the backend system 230 currently has no available, no germinating, or no evolving ML model. Accordingly, as shown in FIG. 11, the backend system 230 will start germinating an ML model 240-1 (also labeled as "S-IoT-1") for the IOT device 211-1 and an ML model 240-2 (also labeled as "S-IoT-?") for the IOT device 211-2 using corresponding IOT operating data collected by the IOT gateway 210-1 and provided to the backend system 230 (see arrow 502). In the example of FIG. 11, the model slots 510-1 and 510-2 are shown as reserved for germinating ML models of the corresponding IOT device. More particularly, the model slot 510-1 of the IOT device 211-1 is reserved for the germinating ML model 240-1, and the slot 510-2 of the IOT device 211-2 is reserved for the germinating ML model 240-2.

Figure 12:
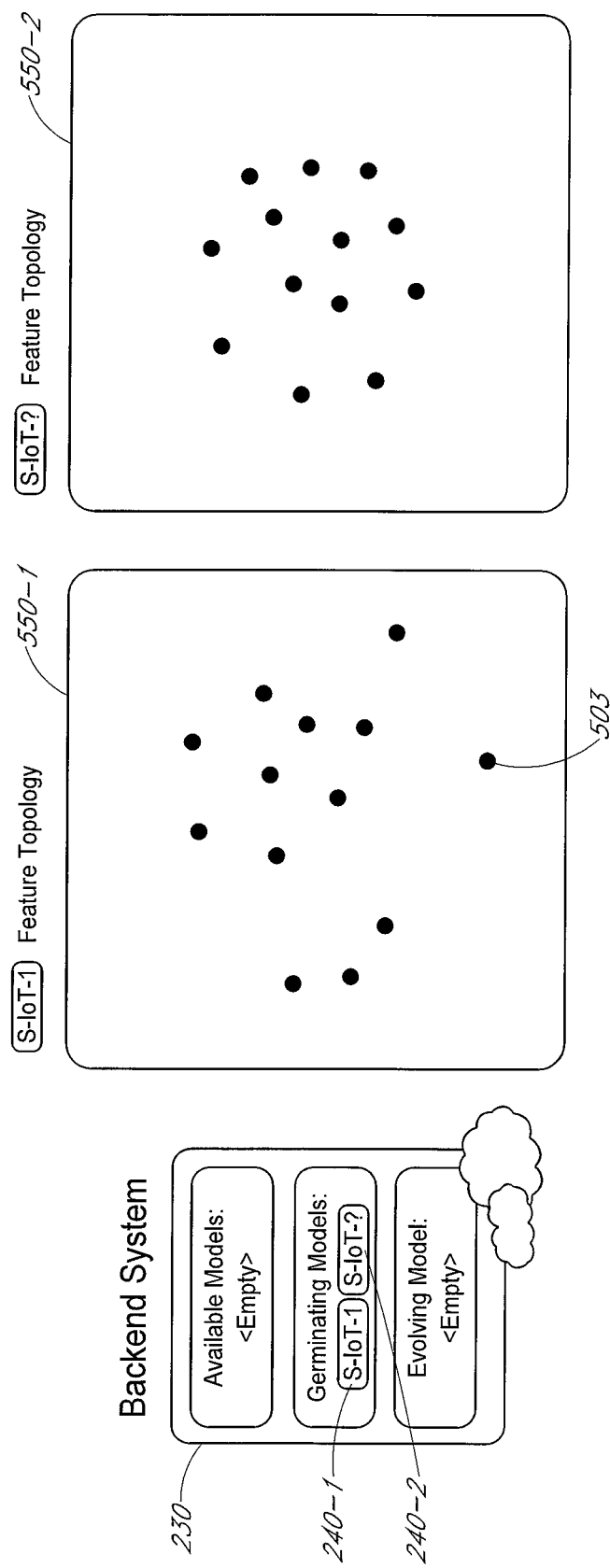

FIG. 12 shows a graphical illustration of collected IOT operating data in accordance with an embodiment of the present invention. In the example of FIG. 12, operational features ("features") that are extracted from IOT operating data are shown in a feature topology. In the example of FIG. 12, a feature topology 550-1 represents operational features (extracted from IOT operating data of the IOT device 211-1) for germinating the ML model 240-1. Similarly, the feature topology 550-2 represents operational features (extracted from IOT operating data of the IOT device 211-2) for germinating the ML model 240-2.

IOT operating data may comprise a set of operational features that indicate operating behavior of an IOT device. For example, operational features may be represented in IOT operating data as:

feature-1 (value), feature-2 (value), . . . , feature-n (value)

with a "feature-n" representing a particular feature of the IOT device and "value" representing the value of that feature. For example, feature-1 may represent sound and value may represent level of the sound, feature-2 may represent brightness and value may represent brightness level in lumen, etc. In one embodiment, features and possible values of the features are part of the profile of an IOT device. One or more features of an IOT device may be represented as dots in a feature topology (e.g., FIG. 12, 503). Accordingly, a feature topology may be multi-dimensional, but only two dimensions are shown herein for clarity of illustration. As can be appreciated, a feature topology may be represented as data structure, array, or some in some other format in memory.

Figure 13:
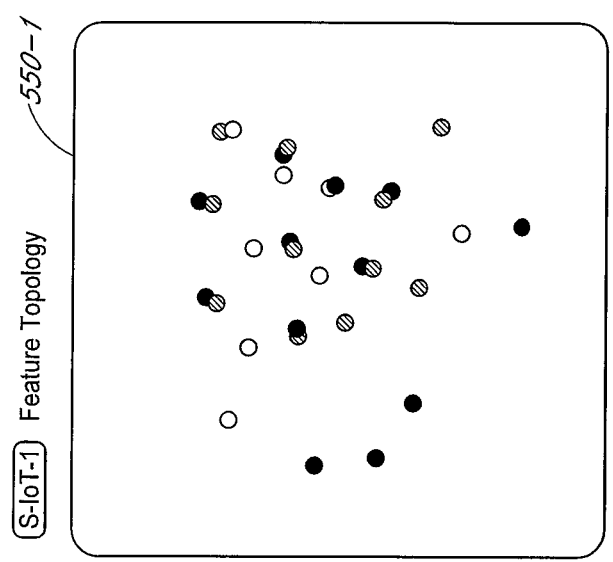
Figure 14:
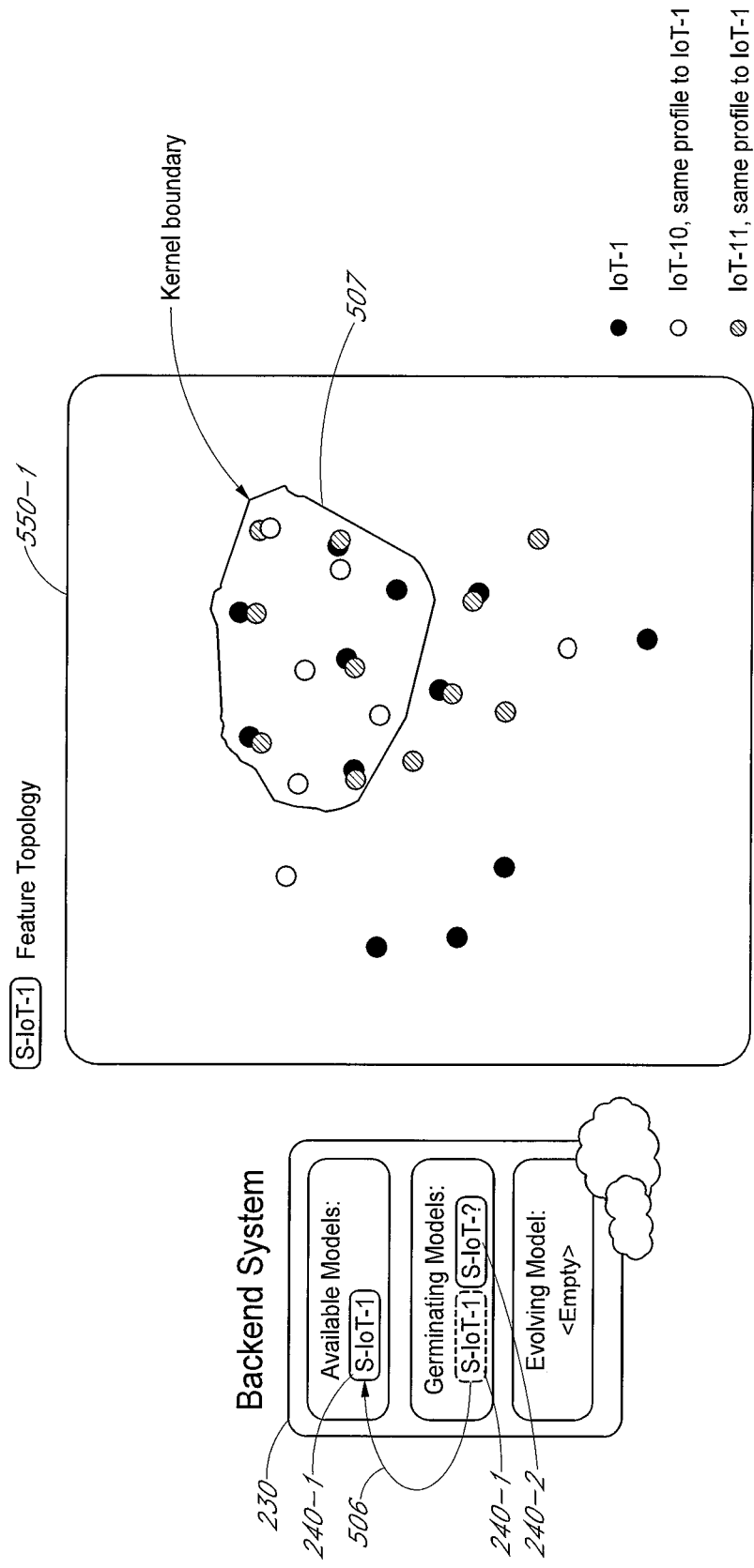

The backend system 230 may combine the features of IOT devices that have the same device profile to generate an ML model. In the example of FIG. 13, the feature topology 550-1 comprises combination of features of the IOT device 211-1 ("IoT-1"), and two other IOT devices (labeled as "IoT-10" and "IoT-11") that have the same device profile as the IOT device 211-1. The features of different IOT devices in feature topologies are represented herein as different shaded dots.

Figure 15:
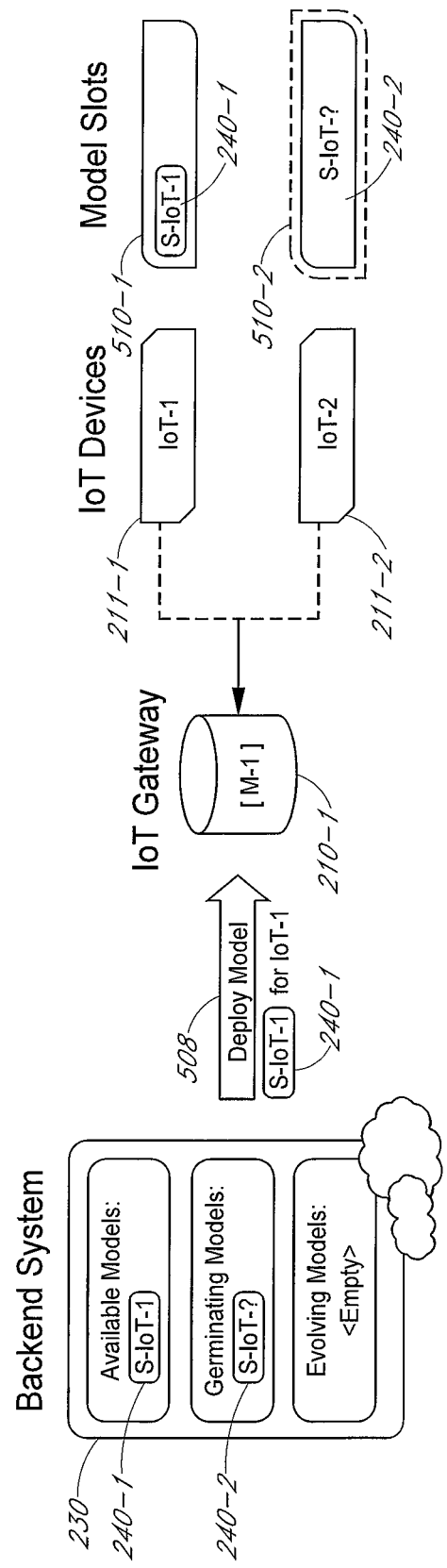

The backend system 230 may continue to receive IOT operating data and extract features from the IOT operating data until there are enough data points to train an ML model. Continuing in the example of FIG. 14, the backend system 230 may begin training of the ML model 240-1 once there are enough data points to form a kernel, which in FIG. 14 has kernel boundary 507. The features within the kernel boundary 507, which may be selected using a clustering algorithm, represent a training data set for training the ML model 240-1. Once the ML model 240-1 is trained, the ML model 240-1 becomes available (see arrow 506) for deployment to the IOT gateway 210-1. This is illustrated in FIG. 15, where the ML model 240-1 is provided to the IOT gateway 210-1 (see arrow 508), which installs the ML model 240-1 in the model slot 510-1. In the example of FIG. 15, the ML model 240-2 intended for the model slot 510-2 remains germinating in the backend system 230. Accordingly, in the example of FIG. 15, the IOT device 211-1 is now protected from cyberattacks, while the IOT device 211-2 still waits for an ML model.

FIGS. 16-21 show logical diagrams that illustrate a method of training an ML model of an unrecognized IOT device in accordance with an embodiment of the present invention.

Figure 16:
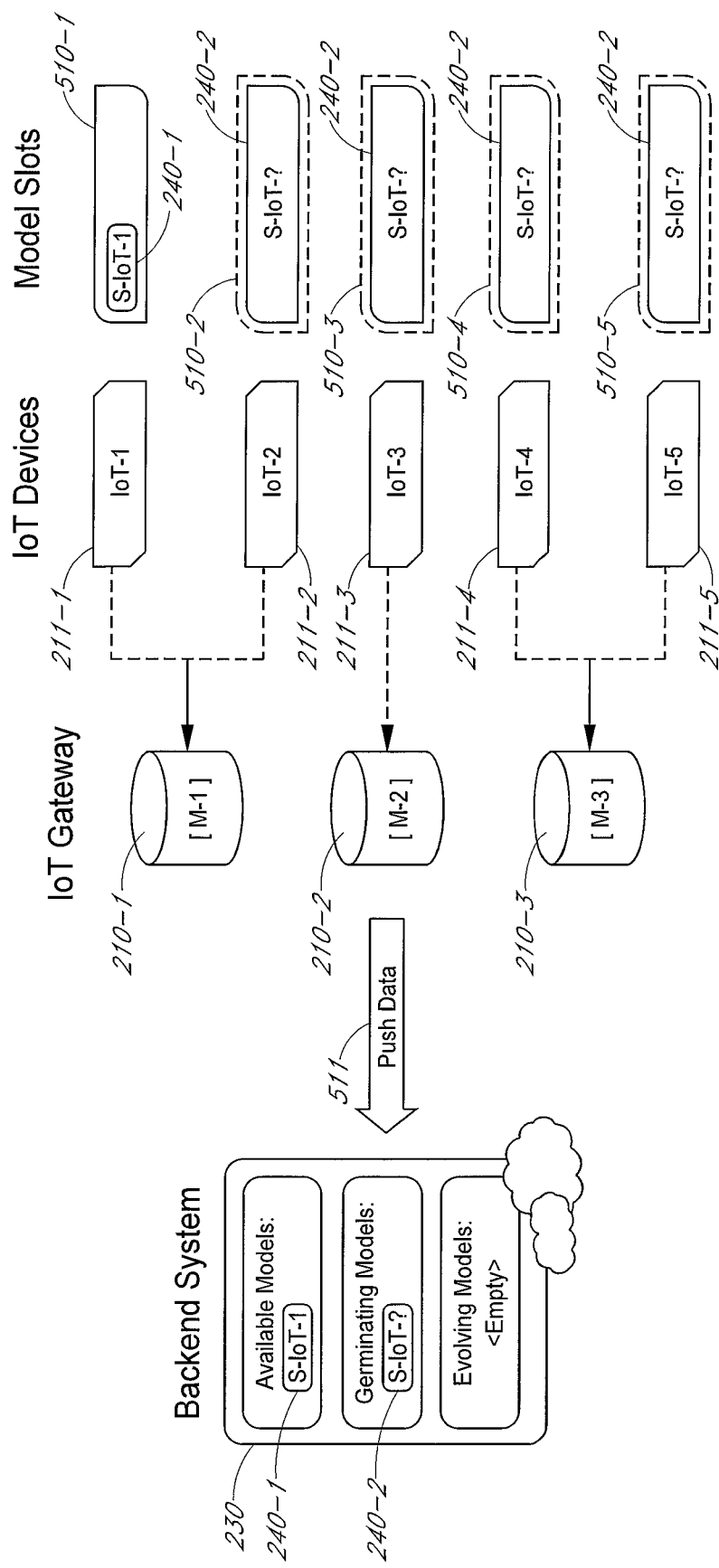
FIGS. 16-21 show logical diagrams that illustrate a method of training an ML model of an unrecognized IOT device in accordance with an embodiment of the present invention.

In the example of FIG. 16, an available ML model 240-1 has been deployed in the IOT gateway 210-1 for the IOT device 211-1. In the example of FIG. 16, the IOT devices 211-2 (also labeled as "IoT-2"), 211-3 (also labeled as "IoT-3"), 211-4 (also labeled as "IoT-4"), and 211-5 (also labeled as "IoT-5") are unrecognized IOT devices. The IOT device 211-2 has a corresponding model slot 510-2 in the IOT gateway 210-1 (also labeled as "[M-1]"), the IOT device 211-3 has a corresponding model slot 510-3 in the IOT gateway 210-2 (also labeled as "[M-2]"), the IOT device 211-4 has a corresponding model slot 510-4 in the IOT gateway 210-3 (also labeled as "[M-3]"), and the IOT device 211-5 has a corresponding model slot 510-5 in the IOT gateway 210-3.

As previously noted with reference to FIG. 7, all unrecognized IOT devices may share the same profile space 410 in the backend system 230. This is reflected in FIG. 16, where the ML model 240-2 is germinating in the backend system 230 for subsequent storage in model slots 510-2, 510-3, 510-4, and 510-5 once the ML model 240-2 becomes available. The IOT gateways 210-1, 210-2, and 210-3 forward IOT operating data of their IOT devices to the backend system 230 (see arrow 511).

Figure 17:
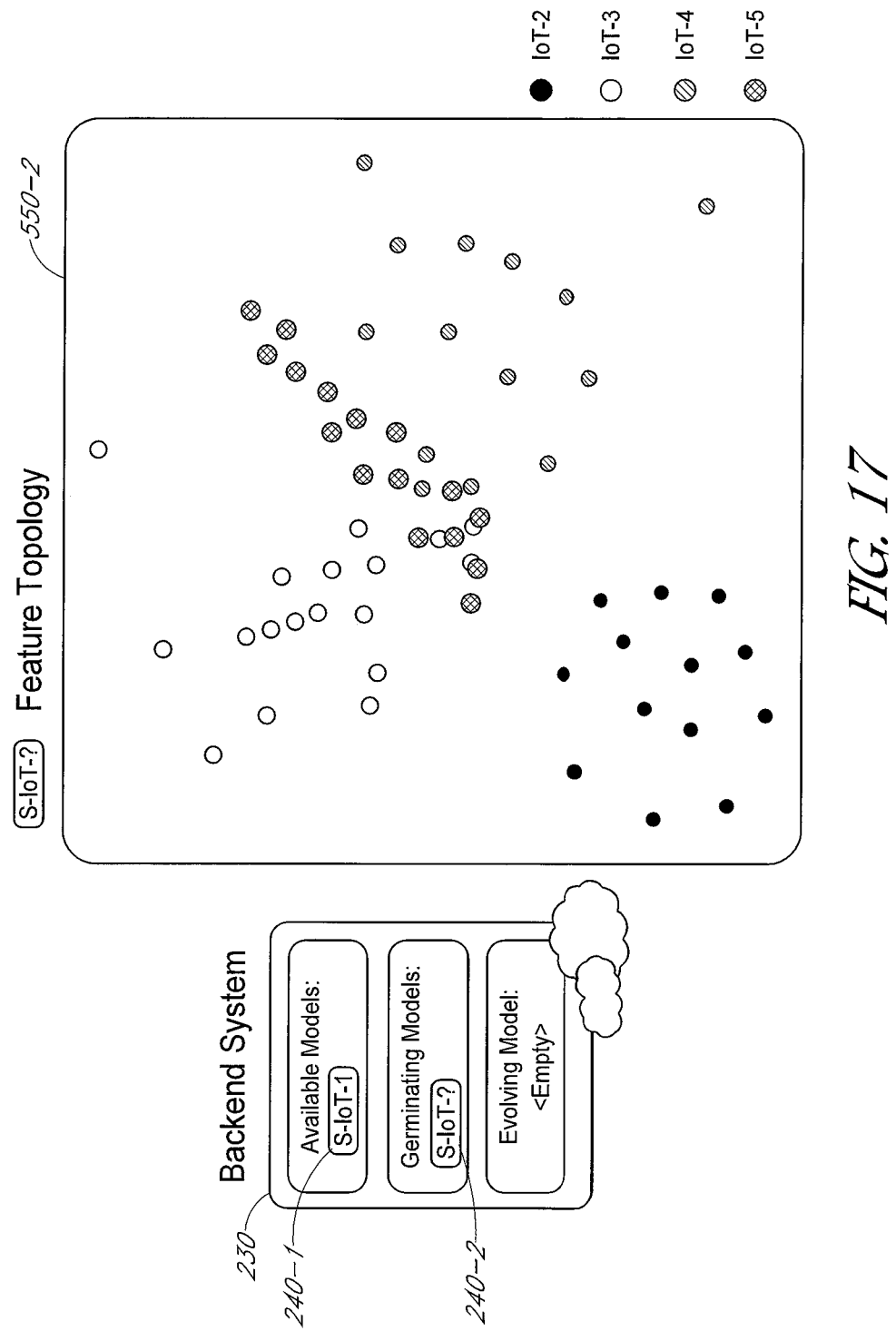

FIG. 17 shows features extracted from collected IOT operating data in accordance with an embodiment of the present invention. FIG. 17 shows the feature topology 550-2 for features of the IOT devices 211-2 (also labeled as "IoT-2"), 211-3 (also labeled as "IoT-3"), 211-4 (also labeled as "IoT-4"), and 211-5 (also labeled as "IoT-5").

Figure 18:
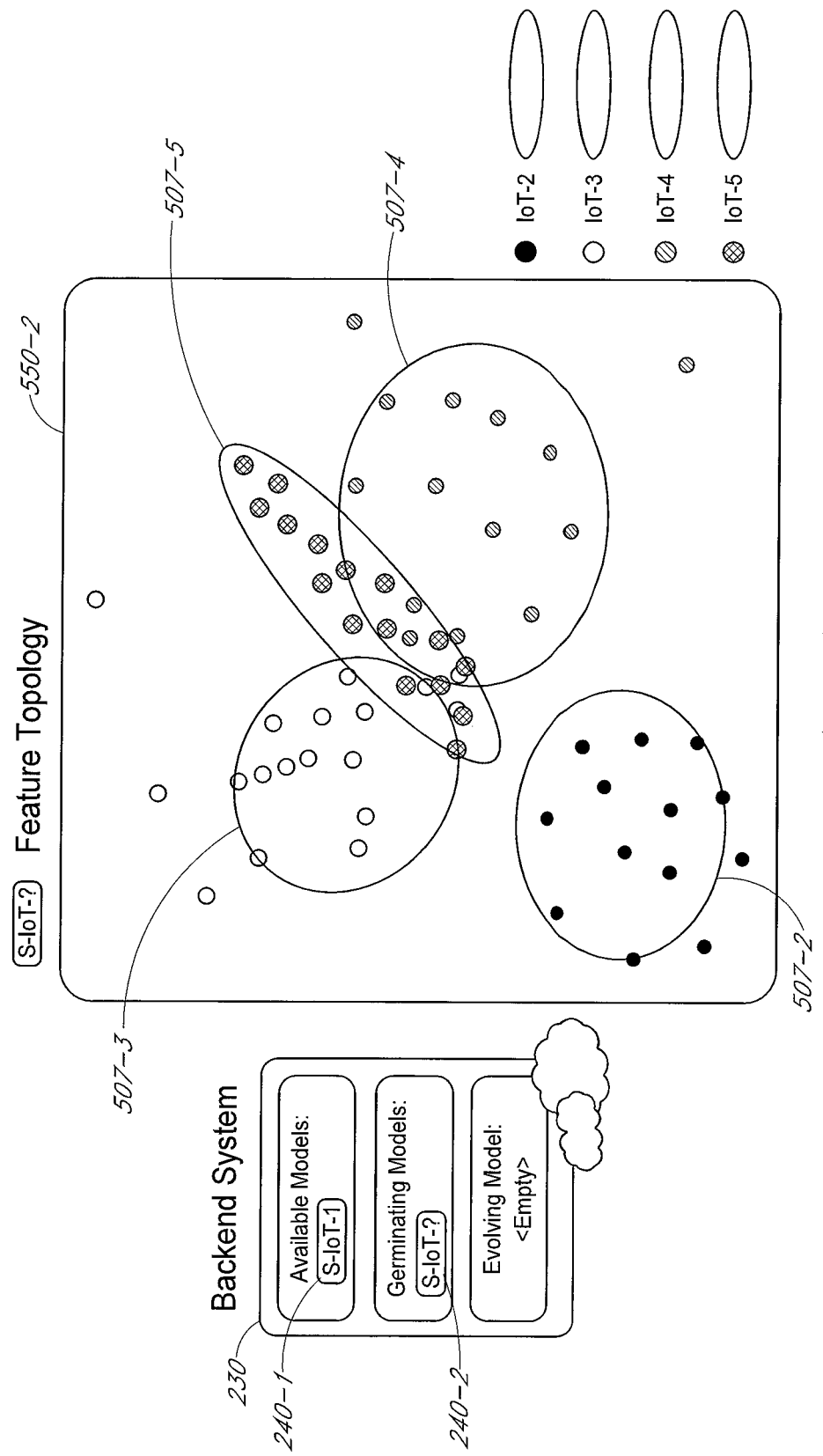

FIG. 18 shows kernel boundaries of kernels of the IOT devices 211-2 (also labeled as "IoT-2"), 211-3 (also labeled as "IoT-3"), 211-4 (also labeled as "IoT-4"), and 211-5 (also labeled as "IoT-5") in the feature topology 550-2. Generally speaking, a kernel will naturally form for features of a particular IOT device, using a clustering algorithm, for example. This is because a feature of a particular IOT device will be more similar to features of that particular IOT device compared to features of other IOT devices. In the feature topology 550-2, a kernel boundary 507-2 surrounds the features of the IOT device 211-2, a kernel boundary 507-3 surrounds the features of the IOT device 211-3, a kernel boundary 507-4 surrounds the features of the IOT device 211-4, and a kernel boundary 507-5 surrounds the features of the IOT device 211-5.

Figure 19:
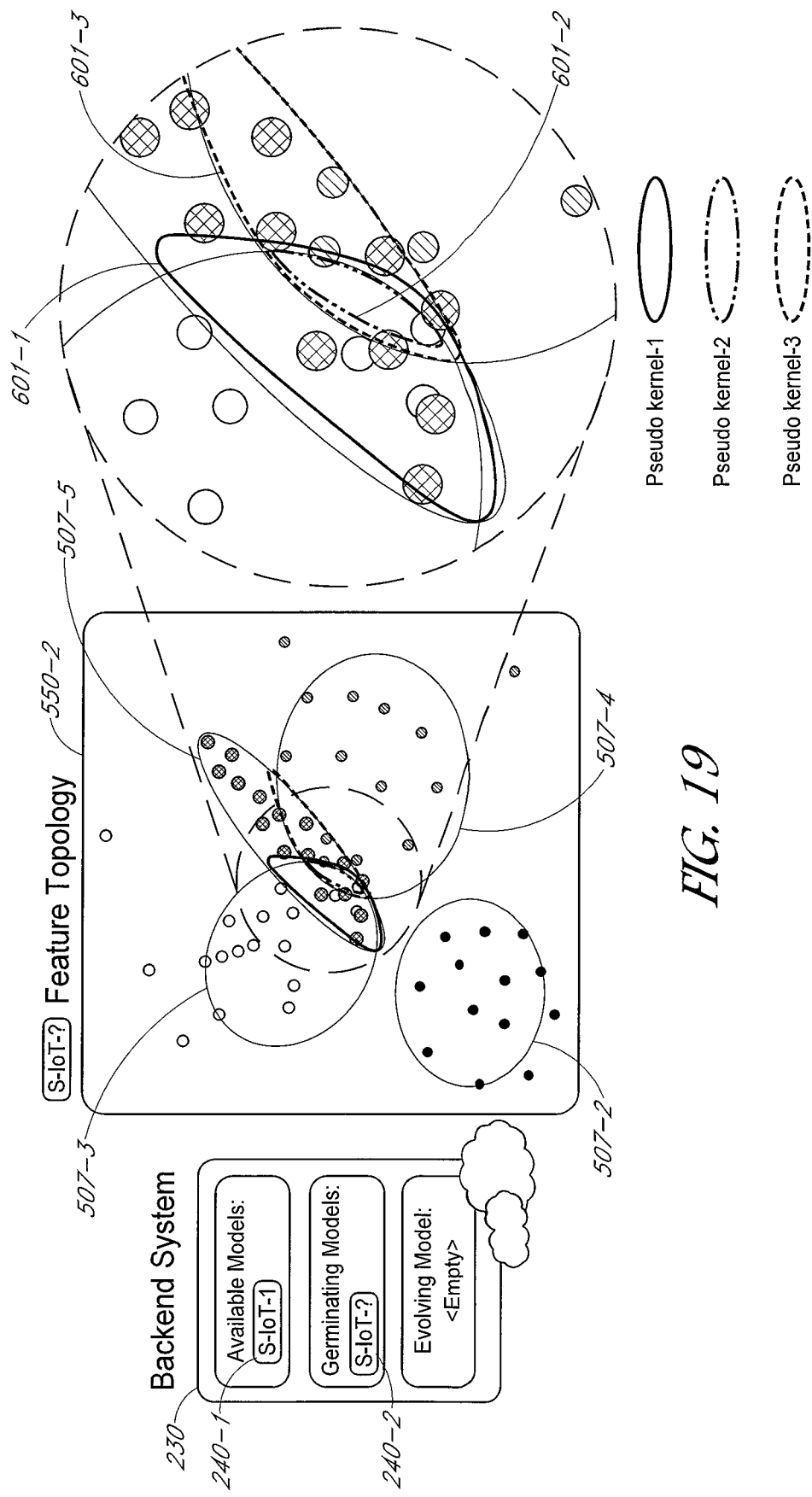
Figure 20:
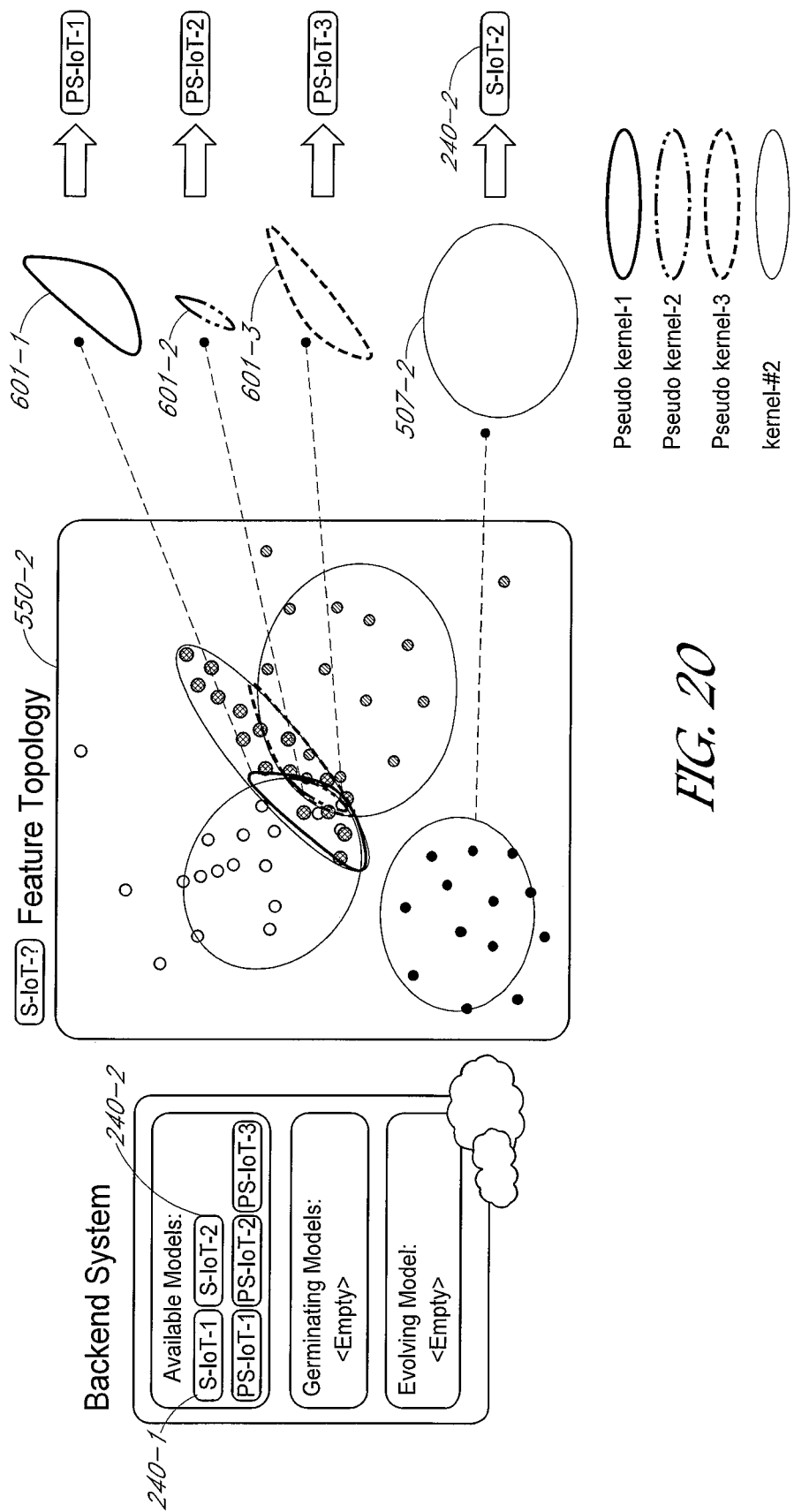

After the kernels of the IOT devices are formed, a pseudo-kernel may be formed for features that are within overlapping kernels of different IOT devices. In the example of FIG. 19, referring to the enlarged area in the middle, pseudo-kernel boundaries 601-1 of a first pseudo-kernel (also labeled as "Pseudo kernel-1"), 601-2 of a second pseudo-kernel (also labeled as "Pseudo kernel-2"), and 601-3 of a third pseudo-kernel (also labeled as "Pseudo kernel-3") are formed on features that are within overlapping kernel boundaries 507-3, 507-4, and 507-5. In the example of FIG. 19, the kernel boundary 507-2 does not overlap with another kernel boundary.

In one embodiment, an ML model may be created for each pseudo-kernel and each kernel. In the example of FIG. 19, features within the pseudo-kernel boundary 601-1 may be used to train a first pseudo-kernel ML model, features within the pseudo-kernel boundary 601-2 may be used to train a second pseudo-kernel ML model, etc. As before, features within the kernel boundary 507-2 may be used to train the ML model 240-2, which is a normal as opposed to a pseudo-kernel model. This is reflected in FIG. 20, where features within the kernel boundary 507-2 are used as training data set for training the ML model 240-2, features within the pseudo-kernel boundary 601-1 are used as training data set for training a pseudo-ML model PS-IoT-1, features within the pseudo-kernel boundary 601-2 are used as training data set for training a pseudo-ML model PS-IoT-2, and features within the pseudo-kernel boundary 601-3 are used as training data set for training a pseudo-ML model PS-IoT-3. In one embodiment, an unrecognized IOT device may have multiple pseudo-ML models in its model slot. The pseudo-ML models may otherwise be employed in the same manner as regular ML models.

Figure 21:
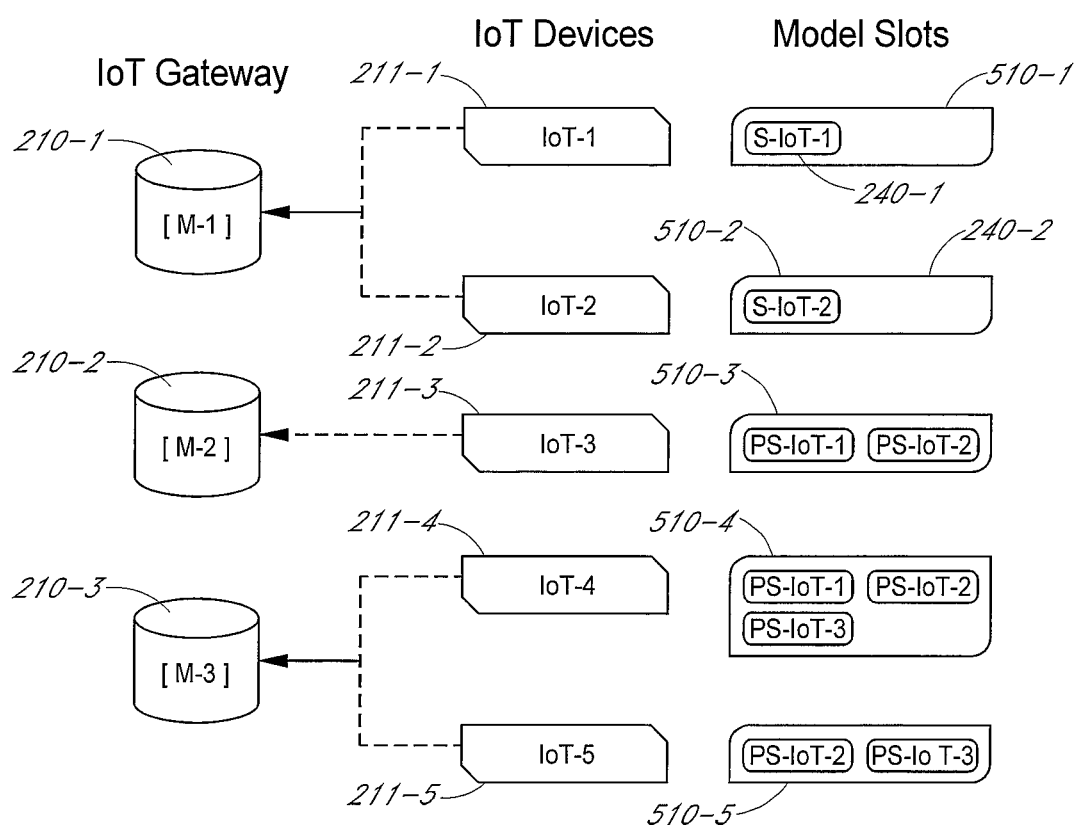

FIG. 21 shows the ML model 240-2, pseudo-ML model PS-IoT-1, pseudo-ML model PS-IoT-2, and pseudo-ML model PS-IoT-3 deployed in model slots of IOT gateways of corresponding IOT devices. As previously noted with reference to FIG. 7, the backend system 230 may provide an unrecognized IOT device an ML model that has been trained with IOT operating data that are similar to IOT operating data of the unrecognized IOT device. In the example of FIG. 21, the ML model 240-2 has been trained primarily with IOT operating data of the IOT device 211-2. Accordingly, the ML model 240-2 is stored in the model slot 510-2, which is reserved for the IOT device 211-2 in the IOT gateway 210-1.

In the example of FIG. 21, the IOT operating data of the IOT device 211-3 are most similar with the training data set of the pseudo-ML models PS-IoT-1 and PS-IoT-2. Accordingly, the pseudo-ML models PS-IoT-1 and PS-IoT-2 are stored in the model slot 510-3, which is reserved for the IOT device 211-3 in the IOT gateway 210-2 (also labeled as "[M-2]"). Each of the pseudo-ML models PS-IoT-1 and PS-IoT-2 may be used to detect anomalous operating behavior of the IOT device 211-3. The same applies to the pseudo-ML models stored in the model slots 510-4 and 510-5, which are reserved for the IOT device 211-4 and 211-5, respectively, in the IOT gateway 210-3 (also labeled as "[M-3]").

Pseudo-ML models, in general, provide many advantages. First, having multiple pseudo-ML models allows for flexibility in protecting unrecognized IOT devices. Second, pseudo-ML models may serve as ensemble materials for training ML models so that false anomaly detection is minimized, similar to using a Boosting algorithm. Third, pseudo-ML models may be used in another application where a pseudo-ML model is trained using malicious IOT operating data. In that application, the pseudo-ML model may be used to identify IOT devices that have similar IOT operating data and are thus malicious.

Figure 22:
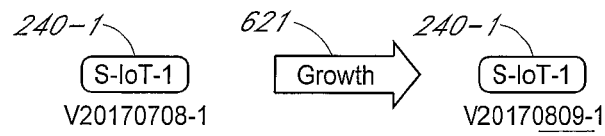
FIG. 22 shows a graphical illustration of an ML model evolving from a previous version to an updated version in accordance with an embodiment of the present invention.

ML models may evolve as more and newer IOT operating data are received by the backend system 230. For example, an ML model may evolve by retraining an ML model using new IOT operating data, such as when a manufacturer updates an IOT device as explained with reference to FIG. 8. FIG. 22 shows a graphical illustration of the ML model 240-1 evolving from version "V20170708-1" to version "V20170809-1" (see arrow 621) by retraining using latest IOT operating data.

Figure 23:
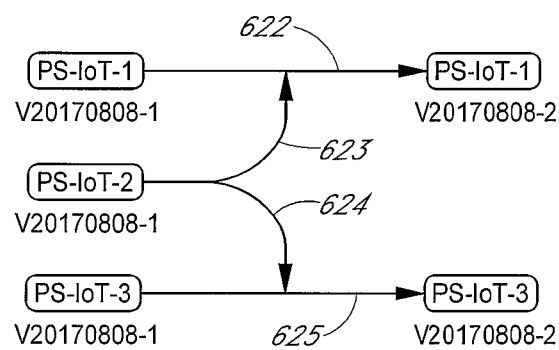
FIG. 23 shows a graphical illustration of pseudo-machine learning models being updated by merging in accordance with an embodiment of the present invention.

ML models may also evolve by merging. Merging two or more ML models reduces the number of ML models to be maintained by the backend system 230. Any suitable merging algorithm, such as Weighted Union, HDBSCAN, etc. algorithms, may be employed without detracting from the merits of the present invention. FIG. 23 shows a graphical illustration of the pseudo-ML model PS-IoT-1 being updated from version "V20170808-1" to version "V20170808-2" (see arrow 622) by merging with the pseudo-ML model PS-IoT-2 version "V20170808-1" (see arrow 623), and pseudo-ML model PS-IoT-3 being updated from version "V20170808-1" to version "V20170808-2" (see arrow 625) by merging with the pseudo-ML model PS-IoT-2 version "V20170808-1" (see arrow 624). The pseudo-ML model PS-IoT-2 is no longer need, and thus can be deleted from the backend system 230, after being merged with other ML models.

Figure 24:
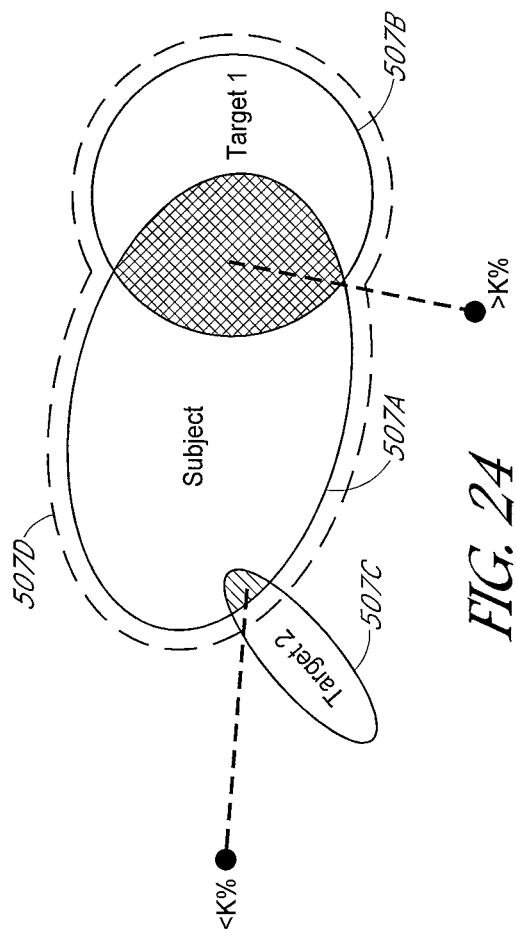
FIG. 24 shows a graphical illustration of a method of evolving an ML model when the kernel of the ML model overlaps with another kernel of another ML model, in accordance with an embodiment of the present invention.

An ML model trained using features of a subject kernel may be evolved when the subject kernel increases such that it overlaps with a target kernel. In one embodiment, the evolving of the ML model is triggered when the overlap between the subject and target kernels is greater than K % of the target kernel. This is graphically illustrated in FIG. 24, where the subject kernel having the kernel boundary 507A increases such that it overlaps with a Target 1 kernel that has a kernel boundary 507B and a Target 2 kernel that has a kernel boundary 507C. In the example of FIG. 24, the overlap between the subject kernel and the Target 1 kernel is greater than K % of the Target 1 kernel. Accordingly, the subject kernel will be expanded to have, for example, the kernel boundary 507D, and the evolving ML model is retrained using the features of the subject kernel and features of the Target 1 kernel within the new kernel boundary. Before adding features of the Target 1 kernel to the subject kernel, the features of the Target 1 kernel may be normalized with the number of IOT devices that provided the features.

In the example of FIG. 24, the overlap between the subject kernel and the Target 2 kernel is less than K % of the Target 2 kernel. Accordingly, the subject kernel is not expanded to include features of the Target 2 kernel.

Figure 25:
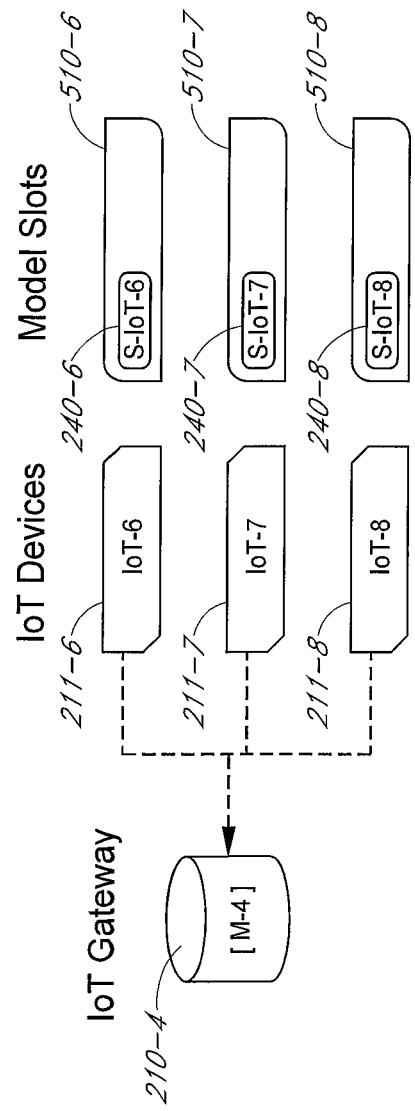
FIG. 25 shows a logical diagram of an IOT gateway paired with IOT devices that have evolving ML models in accordance with an embodiment of the present invention.

The evolving of ML models is further described using the example of FIG. 25, which shows an IOT gateway 210-4 (also labeled as "[M-4]") that is paired with IOT devices 211-6 (also labeled as "IOT-6"), 211-7 (also labeled as "IOT-7"), and 211-8 (also labeled as "IOT-8"). The IOT gateway 210-4 has model slots 510-6, 510-7, and 510-8 that contain ML models 240-6 (also labeled as "S-IoT-6"), 240-7 (also labeled as "S-IoT-7"), and 240-8 (also labeled as "S-IoT-8") for the IOT devices 211-6, 211-7, and 211-8, respectively.

Figure 26:
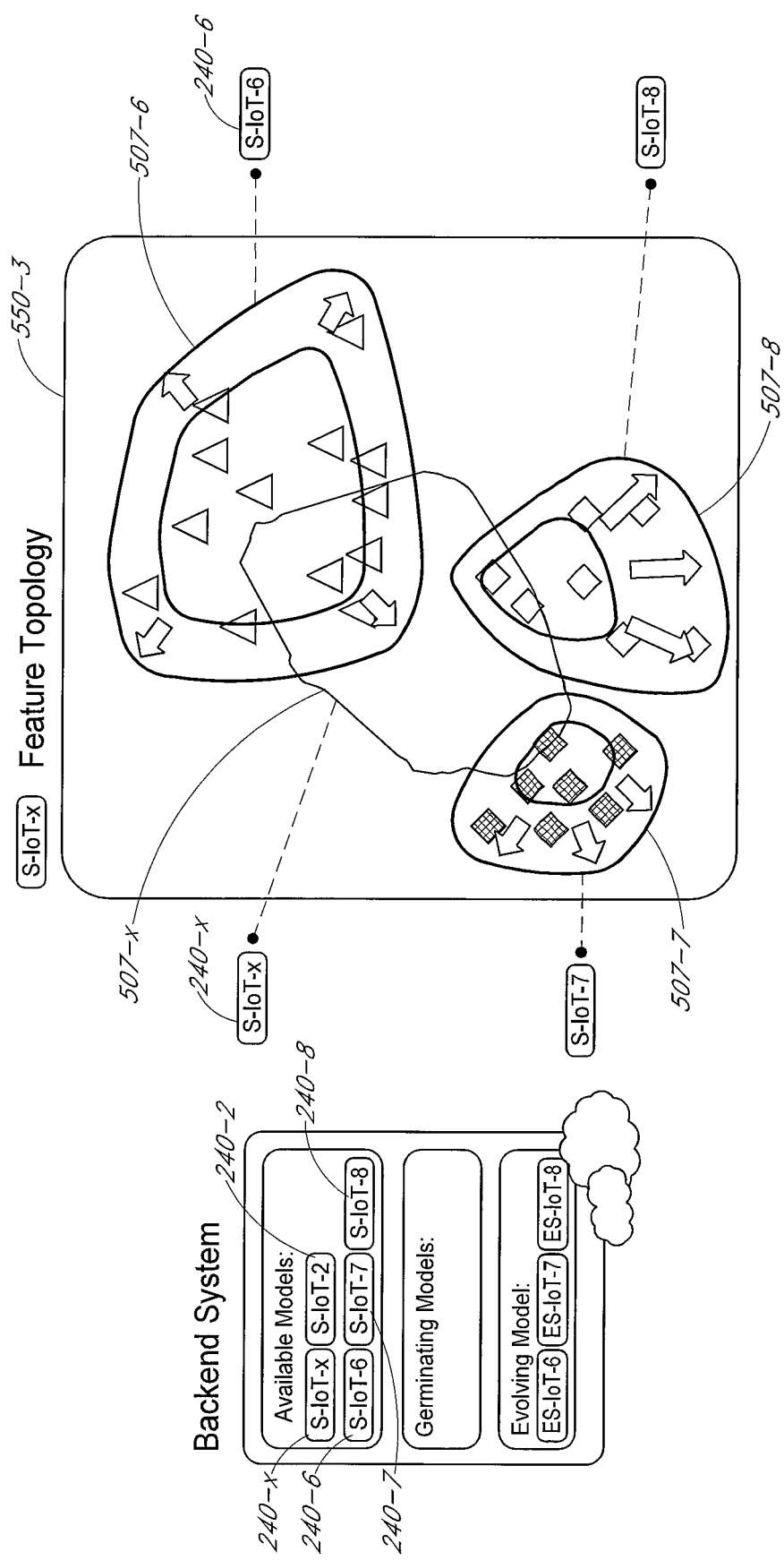
FIGS. 26-29 show logical diagrams that illustrate evolution of ML models of the IOT devices of FIG. 25.

In the example of FIG. 25, the IOT devices 211-6, 211-7, and 2118 are unrecognized IOT devices. FIG. 26 shows a graphical illustration of the evolving of the ML model 240-6 in accordance with an embodiment of the present invention. The features of the unrecognized IOT devices 211-6, 211-7, and 2118 are shown in the feature topology 550-3. The features used to train the ML models 240-6, 240-7, and 240-8 have increased so that their kernel boundaries 507-6, 507-7, and 507-8 have expanded past the kernel boundary 507-$x$ of the kernel having features used to train the ML model 240-$x$ (also labeled as "S-IoT-x"). In the example of FIG. 25, only the kernel boundary 507-6 has expanded enough to trigger evolving. It is to be noted that the ML model 240-6 will evolve, but not the ML model 240-$x$, because the kernel of the ML model 240-6 is the one that is increasing.

Figure 27:
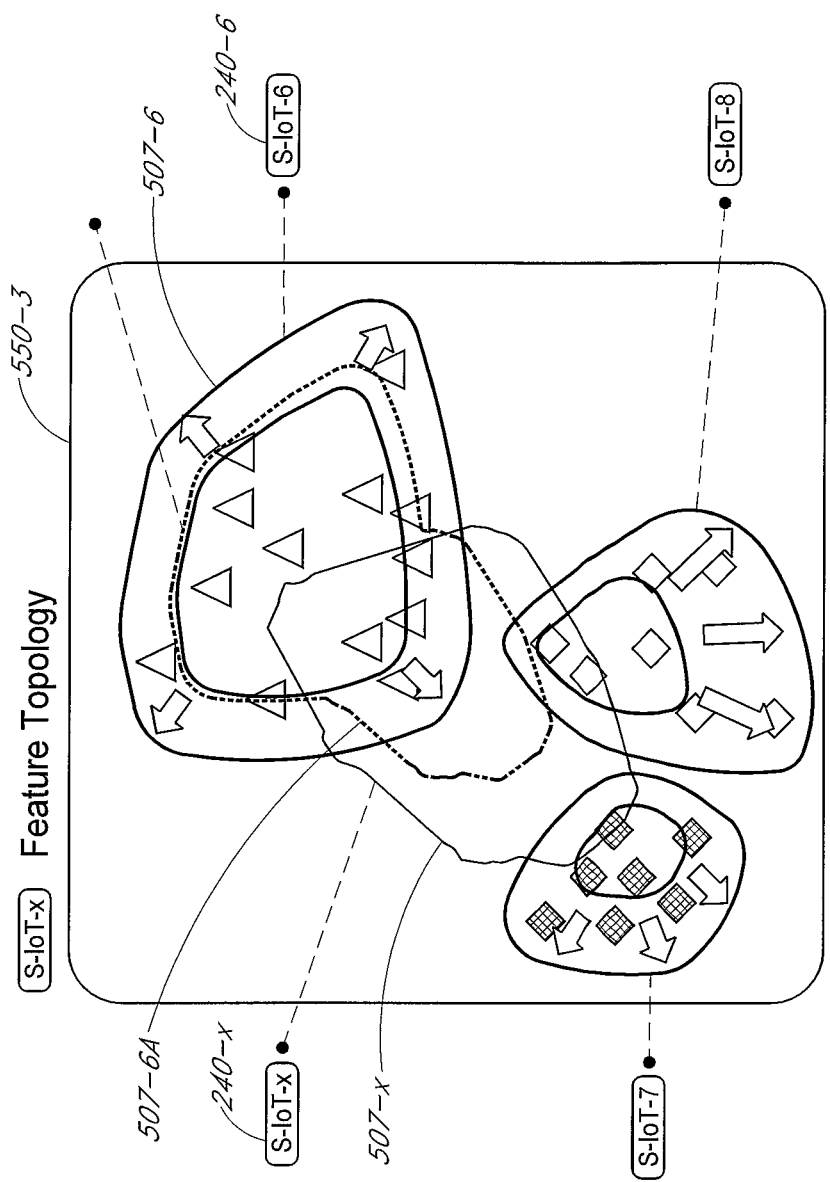

In the example of FIG. 26, the backend system 230 has available ML models 240-$x$, 240-2, 240-6, 240-7, and 240-8. The backend system 230 also has evolving ML models ES-IoT-6, ES-IoT-7, and ES-IoT-8, which are evolving versions of the ML models 240-6, 240-7, and 240-8, respectively. In the example of FIG. 26, only the ML model ES-IoT-6 will fully evolve for deployment to the IOT gateway because the features of the other ML models have not increased past the threshold K % to trigger evolving. The evolving of the ML model ES-IoT-6 for deployment is graphically illustrated in FIG. 27, where the kernel boundary 507-6A outlines the kernel with features that will be used to train the evolved ML model 240-6, which is also referred to as ML model ES-IoT-6. FIG. 27 also shows the kernel boundary 507-6 of the kernel used to train the ML model 240-6 and the kernel boundary 507-$x$ of the kernel used to train the ML model 240-$x$.

It is to be noted that the kernel boundary of an evolving subject ML model does not necessarily have to encompass the entirety of the kernel of a target ML model it is colliding into to limit the evolving to include common features, as opposed to outliers. This is reflected in FIG. 27, where the kernel boundary 507-6A does not encompass the entirety of the kernel with features used to train the ML model 240-x. In one embodiment, a kernel boundary of an evolved ML model may be found according to the following procedure:

(a) Select all features ("selected features") of the subject (evolving) ML model and the target ML model.

(b) Normalize the selected features that are from target ML model (based on the number of IOT devices that contributed to the features of the target ML model).

(c) Reconstruct the kernel using the normalized selected features.

(d) Update the ML model evolution tree to keep track of changes.

Figure 28:
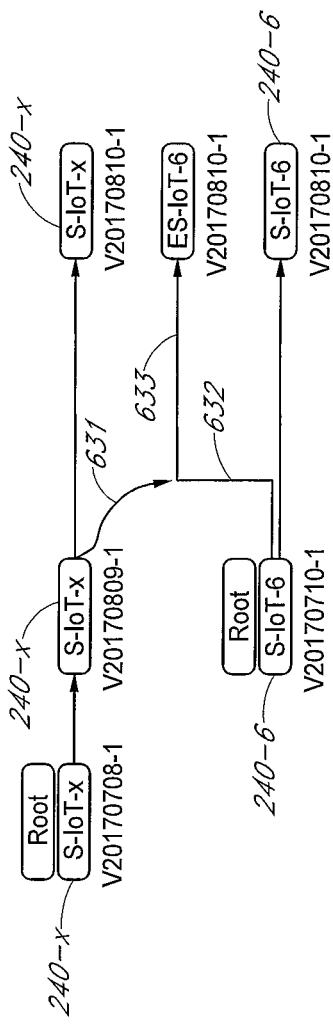

FIG. 28 shows an ML model evolution tree, graphically illustrating the evolving of the ML model ES-IoT-6 (see arrow 633) from the ML model 240-x (see arrow 631) and the ML model 240-6 (see arrow 632)

Figure 29:
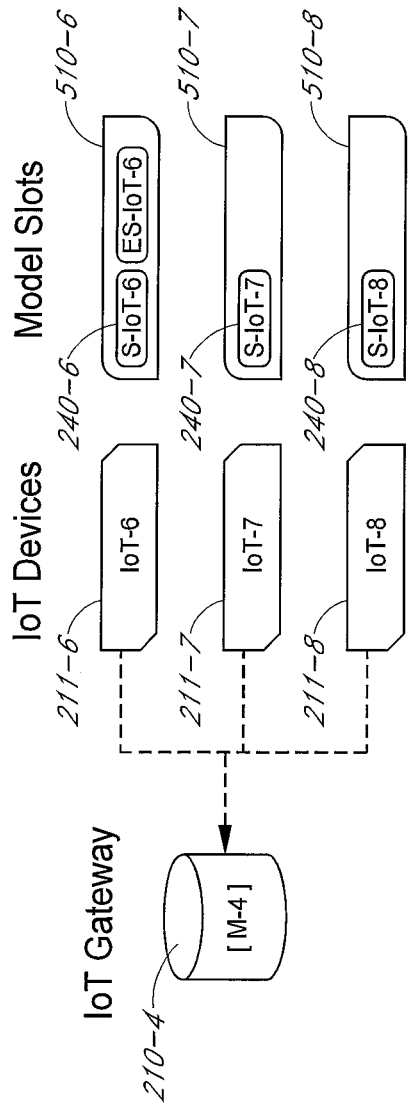

The evolved ML model ES-IoT-6 may be deployed to the IOT gateway 210-4. This is illustrated in FIG. 29, where the ML model ES-IoT-6 is installed in the model slot 510-6 along with the ML model 240-6. Both the ML model 240-6 and the ML model ES-IoT-6 may be used to detect anomalous operating behavior of the IOT device 211-6.

Figure 30:
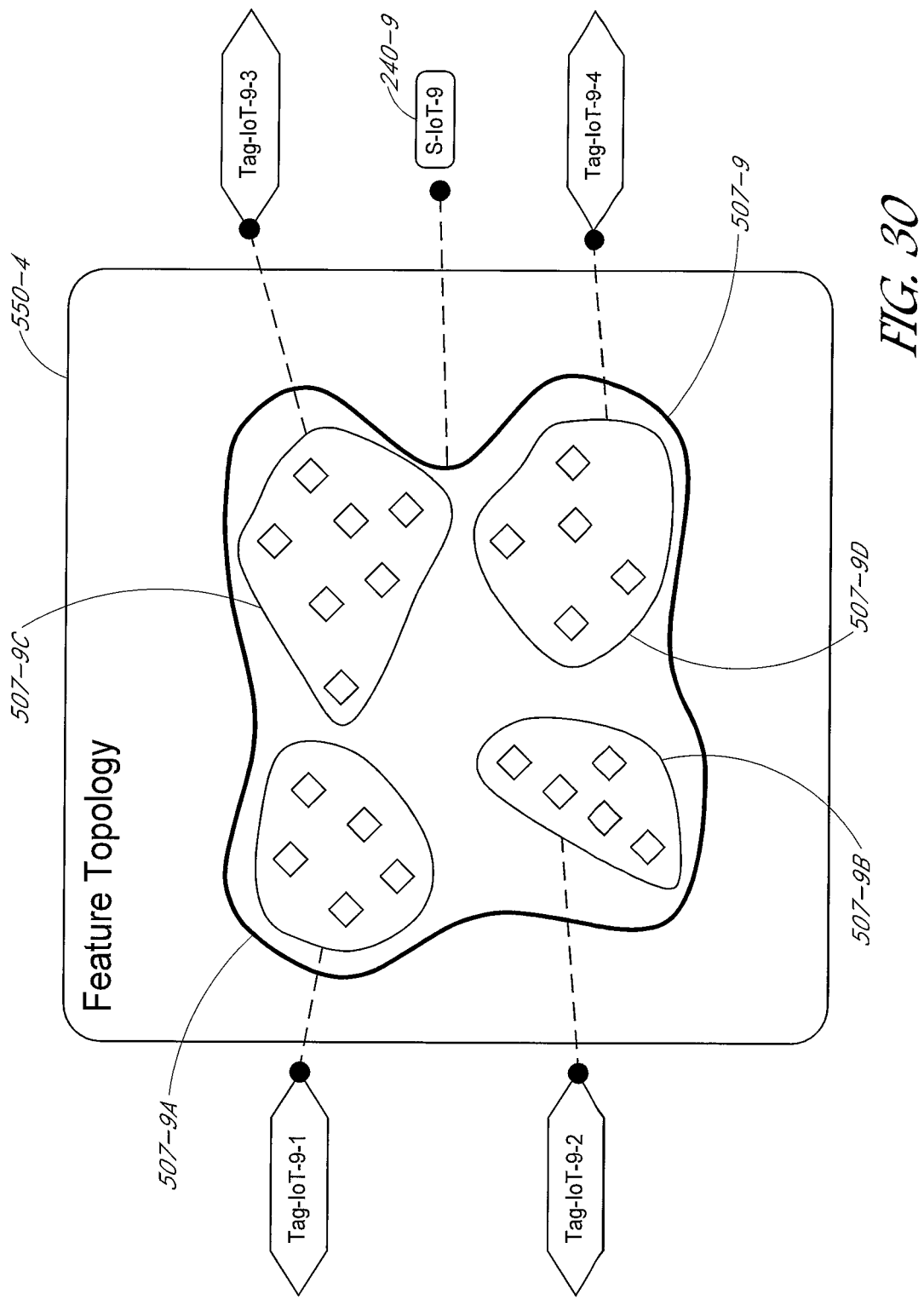
FIG. 30 shows a graphical illustration of tagging a kernel of an ML model in accordance with an embodiment of the present invention.

In one embodiment, when the number of features for training an ML model is large enough, the ML model may have sub-models within the ML model. The sub-models of an ML model are also referred to herein as "tags." In the example of FIG. 30, a feature topology 550-4 shows the features of a kernel with a kernel boundary 507-9. The features within the kernel boundary 507-9 are used as data set for training an ML model 240-9. In the example of FIG. 30, several sub-models may be identified within the kernel boundary 507-9. More particularly, the feature topology 550-4 shows a kernel boundary 507-9A for a sub-model Tag-IoT-9-1, a kernel boundary 507-9B for a sub-model Tag-IoT-9-2, a kernel boundary 507-9C for a sub-model Tag-IoT-9-3, and a kernel boundary 507-9D for a sub-model Tag-IoT-9-4. A sub-model still belongs to the parent model, which in the example of FIG. 30 is the ML model 240-9. A sub-model may be merged with another sub-model within the same parent model, but not with another ML model.

Methods and systems for protecting a smart home from cyberattacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for providing cybersecurity to a smart home, the system comprising:
a plurality of Internet of things (IOT) devices deployed in the smart home, each of the plurality of IOT devices comprising an embedded computer;
a backend system that is configured to receive IOT operating data of a first IOT device of the plurality of IOT devices and to generate a first machine learning model using the IOT operating data of the first IOT device, the backend system comprising a computer;
an IOT gateway that is paired with the plurality of IOT devices, the IOT gateway being configured to transmit to the backend system the IOT operating data of the first IOT device, receive the first machine learning model from the backend system, store the first machine learning model in the IOT gateway, receive additional IOT operating data of the first IOT device, to consult the first machine learning model with the additional IOT operating data of the first IOT device to detect that the first IOT device is exhibiting anomalous operating behavior, and to perform a security action in response to detecting that the first IOT device is exhibiting anomalous operating behavior, the IOT gateway comprising a computer,
wherein the plurality of IOT devices includes a second IOT device and a third IOT device that are not recognized by the backend system,
wherein the backend system is configured to generate a second machine learning model using IOT operating data of the second and third IOT devices, and
wherein the IOT gateway is further configured to store the second machine learning model in the IOT gateway, to receive additional IOT operating data of the second IOT device, and to consult the second machine learning model with the additional IOT operating data of the second IOT device to detect that the second IOT device is exhibiting anomalous operating behavior.

2. The system of claim 1, wherein the security action includes sending an alert to a device of a resident of the smart home.

3. The system of claim 1, wherein the first IOT device is a smart bulb.

4. The system of claim 1, wherein the IOT operating data of the first IOT device and the first machine learning model are stored in a same profile space in a memory of the backend system.

5. The system of claim 1, wherein the IOT gateway is further configured to receive additional IOT operating data of the third IOT device, and to consult the second machine learning model with the additional IOT operating data of the third IOT device to detect that the third IOT device is exhibiting anomalous operating behavior.

6. The system of claim 5, wherein the backend system is configured to store the IOT operating data of the second IOT device and the IOT operating data of the third IOT device in a same shared profile space in a memory of the backend system.

* * * * *